United States Patent
Sethi et al.

(10) Patent No.: US 10,432,662 B2
(45) Date of Patent: Oct. 1, 2019

(54) METHOD AND SYSTEM FOR BLOCKING MALICIOUS THIRD PARTY SITE TAGGING

(71) Applicant: Yahoo Holdings, Inc., Sunnyvale, CA (US)

(72) Inventors: Vibha Sethi, Sunnyvale, CA (US); Binu Ramakrishnan, Milpitas, CA (US); Christopher Harrell, San Jose, CA (US)

(73) Assignee: Oath, Inc., New York, NY (US)

( * ) Notice: Subject to any disclaimer, the term of this patent is extended or adjusted under 35 U.S.C. 154(b) by 83 days.

(21) Appl. No.: 14/700,456

(22) Filed: Apr. 30, 2015

(65) Prior Publication Data

US 2016/0323309 A1  Nov. 3, 2016

(51) Int. Cl.
*H04L 29/06* (2006.01)

(52) U.S. Cl.
CPC ........ *H04L 63/1466* (2013.01); *H04L 63/101* (2013.01)

(58) Field of Classification Search
CPC .......................... H04L 63/101; H04L 63/1466
USPC .......................................................... 726/1
See application file for complete search history.

(56) References Cited

U.S. PATENT DOCUMENTS

| | | | | |
|---|---|---|---|---|
| 6,873,984 B1* | 3/2005 | Campos | ........... | G06F 17/30864 |
| 8,589,790 B2* | 11/2013 | Seolas | .............. | G06F 17/30899 715/234 |
| 2012/0131446 A1* | 5/2012 | Park | .................. | H04M 1/72561 715/238 |
| 2013/0339841 A1* | 12/2013 | Petti | .................... | G06F 17/2247 715/234 |
| 2016/0048602 A1* | 2/2016 | Yastrebenetsky | | ........................... G06F 17/30864 715/234 |

OTHER PUBLICATIONS

Content Security Policy 1.1, W3C Working Draft, Feb. 11, 2014, http://www.w3.org/TR/2014/WD-CSP11-20140211/,http://www.iab.net/media/file/SiteTaggingBP_v1.0.pdf.

* cited by examiner

*Primary Examiner* — Dant B Shaifer Harriman
(74) *Attorney, Agent, or Firm* — Pillsbury Winthrop Shaw Pittman LLP

(57) ABSTRACT

The present teaching relates to blocking malicious third party site tagging using content security policy (CSP). A request to access a web page is first received for obtaining a page resource associated with the web page. One or more tags are further added to the page resource, and one or more tag sources corresponding to the one or more tags are interpreted. Based on the one or more tag sources, at least one content security policy is constructed and enforced on the page resource. The web page is presented to the user with whitelisted tags in accordance with the enforced at least one content security policy.

21 Claims, 19 Drawing Sheets

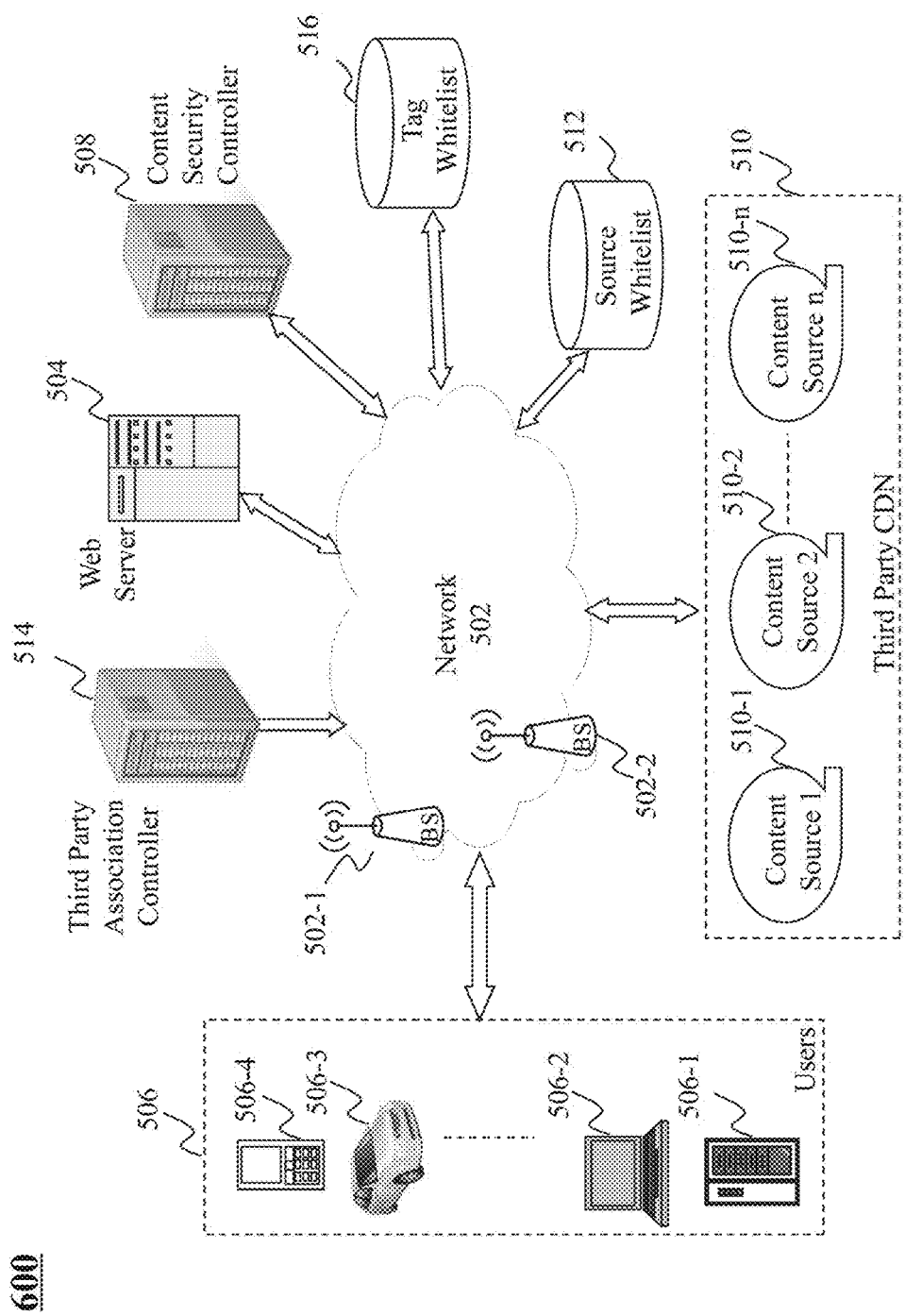

METHOD AND SYSTEM FOR BLOCKING MALICIOUS THIRD PARTY SITE TAGGING

BACKGROUND

1. Technical Field

The present teaching relates to methods, systems, and programming for website tagging. In particular, the present teaching relates to methods, systems, and programming for blocking malicious third party site tagging.

2. Discussion of Technical Background

Online publishers instrument numerous third party site tags for marketing and analytics which includes targeting, ad verification, ad serving, tracking return on investment (ROI), etc., and for augmenting consumer experience via online surveys and recommendations. In general, third party site tags are instrumented by incorporating JavaScript or HTML code to the publisher web page. While tags are helpful in many ways such as personalizing contents, increasing ROI, better targeting, etc., however, incorporation of any third party code that are not administrated by the publisher can lead to security vulnerabilities such as Document Object Module (DOM) exposure, which may leads to compromise of user credentials, fake clicks or other user interactions, view of user keystrokes, malicious access and tampering of the publisher page content; objectionable content being loaded on the web page, which may lead to malware, malformed, or slow content browsing and impact the user experience on the page; violation of user privacy, in which by allowing the third parties to execute JavaScript on the publisher web page, the third parties can collect user personally identifiable information (PII) data associated with the publisher, and thus impacting user privacy; and data leakage, in which by referencing to an arbitrary third party code incorporated to a publisher web page, a fourth party or another entity that has no valid contract with the publisher may be externally invoked. Therefore, the publisher may be unaware of data leakage to the fourth party or another entity including user data and business data associated with the publisher web page.

As a standard practice, the publisher regularly tests the third party tags to ensure that data being collected is limited to business purpose and no fourth party piggybacking; and enforces terms and conditions declaring what a third party tag can do on the publisher web page. However, given that the third party tags are very rarely hosted on the publisher server due to maintenance and operational costs, the JavaScript or HTML code associated with these tags are not administrated by the publisher. Therefore, changes that are not approved by the publisher can be easily introduced to the tags. To prevent the unauthorized changes to the third party tags, the publisher implements a monitoring scheme that triggers an alert once a change in the third party tags is detected. However, actions to protect the data are usually taken after the monitoring scheme sends the alert, and important business data and/or sensitive user data associated with the publisher web page may have exposed to the fourth parties or other entities via the tampered third party tags.

FIG. 1 shows an exemplary tag loading process in the prior art. A web page 102 hosts a plurality of tags that are associated with tag sources. When a request to load Tag 1 is sent from the web page 102, as the source of Tag 1 104 is an associated third party with the web page, the Tag 1 source 104 returns the content to be loaded in response to the request to load Tag 1. However, JavaScript of Tag 1 is hosted and administrated on the third party domain, and the web page 102 has no control on the JavaScript. When the JavaScript of Tag 1 includes domains of other succeeding tags that are not associated with the web page, the web page administrator has no effective way to prevent these succeeding tags from being loaded on the web page. For example, Tag 1 also refers to succeeding Tag 1-1, . . . , Tag 1-n. When Tag 1 source 104 is called, Tag 1-1 source 106, . . . , Tag 1-n source 108 are also called to load the contents. The contents of the succeeding tags are returned and boarded on the web page without scrutinizing whether the Tag 1-1 source 106, . . . , Tag 1-n source 108 are harmless to the web page. In an example that the web page 102 is Yahoo! mail and the tag source 104, is trackers instrumented on Yahoo! mail for analyzing audience behavior, Yahoo! mail has no effective way to ensure that when Tag 1 is loaded on the Yahoo! mail, it does not piggyback any other tags or sources, for example, Google analytics for analytic enhancement, which could lead to Yahoo! losing their critical business and user sensitive data to one of its main competitors.

Accordingly, it is crucial for the publisher to restrict instrument tags to just the third parties whose JavaScript or HTML code has been vetted and approved by the publisher. The third parties may only collect data from the publisher web page for certain business purpose according to the agreed terms and conditions with the publisher as to how the collected data can be used and stored, and ensure that the data is not to be shared with unauthorized entities and there is a process to delete these data. Current approach to identify the violating third party site tags is through regular auditing. However, there has not been an effective way of whitelisting the resources from which the content can be loaded on the publisher web page.

Therefore, there is a need to provide an improved solution for preventing malicious third party site tagging to solve the above-mentioned problems.

SUMMARY

The present teaching relates to methods, systems, and programming for website tagging. In particular, the present teaching relates to methods, systems, and programming for blocking malicious third party tagging using content security policy (CSP).

According to an embodiments of the present teaching, a method, implemented on a computing device having at least one processor, storage, and a communication platform connected to a network for blocking malicious third party site tagging using content security policy (CSP) comprises receiving from a user, a request to access a web page; obtaining a page resource associated with the web page; adding one or more tags to the page resource; interpreting one or more tag sources corresponding to the one or more tags, respectively; constructing at least one content security policy based on the one or more tag sources; enforcing the at least one content security policy on the page resource; and presenting to the user, the web page in accordance with the enforced at least one content security policy.

In some embodiments, the method further comprises receiving an application to board the one or more tags on the web page; determining whether each of the one or more tag sources is a third party domain associated with the web page; if one tag source is the third party domain associated with the web page, generating a whitelisted source corresponding to the tag source; and storing the whitelisted source in a database.

In some embodiments, the method further comprises obtaining at least one succeeding tag from the one or more tags; determining whether the at least one succeeding tag complies with the at least one content security policy; and if the at least one succeeding tag complies with the at least one content security policy, obtaining at least one succeeding tag resource associated with the at least one succeeding tag.

In some embodiments, the method further comprises if the at least one succeeding tag does not comply with the at least one content security policy, blocking at least one succeeding tag source corresponding to the at least one succeeding tag; and generating a violation record including the at least one succeeding tag source, violated content security policy, and a preceding tag source.

In some embodiments, the method further comprises if the at least one succeeding tag does not comply with the at least one content security policy, obtaining at least one succeeding tag resource associated with the at least one succeeding tag; and generating a violation record including the at least one succeeding tag source, violated content security policy, and a preceding tag source.

In some embodiments, the method further comprises applying the at least one content security policy to one or more scenarios; evaluating the at least one succeeding tag in the one or more scenarios; determining whether the at least one content security policy performs consistently across the one or more scenarios; if the at least one content security policy performs consistently across the one or more scenarios, generating a whitelisted source corresponding to the at least one succeeding tag; and storing the whitelisted source in a database.

In some embodiments, the at least one content security policy defines the one or more tag sources as whitelisted sources from which the one or more tags and at least one succeeding tag are allowed to be boarded on the web page.

According to yet another embodiment of the present teaching, a system having at least one processor storage, and a communication platform for blocking malicious third party site tagging using content security policy (CSP) comprises a user interfacing module configured to receive from a user, a request to access a web page; a page retrieving module configured to obtain a page resource associated with the web page; a tag adding module configured to add one or more tags to the page resource; an interpreting module configured to interpret one or more tag sources corresponding to the one or more tags, respectively; a content security policy constructing module configured to construct at least one content security policy based on the one or more tag sources; an enforcing module configured to enforce the at least one content security policy on the page resource; and a presenting module configured to present to the user, the web page in accordance with the enforced at least one content security policy.

In some embodiments, the system further comprises a third party interfacing module configured to receive an application to board the one or more tags on the web page; a tag processing module configured to determine whether each of the one or more tag sources is a third party domain associated with the web page; and a source whitelist generating module configured to generate a whitelisted source corresponding to the tag source and store the whitelisted source in a database, if one tag source is the third party domain associated with the web page.

In some embodiments, the system further comprises a succeeding tag obtaining module configured to obtain at least one succeeding tag from the one or more tags; and a succeeding tag processing module configured to determine whether the at least one succeeding tag complies with the at least one content security policy; and if the at least one succeeding tag complies with the at least one content security policy, obtain at least one succeeding tag resource associated with the at least one succeeding tag.

In some embodiments, if the at least one succeeding tag does not comply with the at least one content security policy, the succeeding tag processing module is further configured to block at least one succeeding tag source corresponding to the at least one succeeding tag; and generate a violation record including the at least one succeeding tag source, violated content security policy, and a preceding tag source.

In some embodiments, if the at least one succeeding tag does not comply with the at least one content security policy, the succeeding tag processing module is further configured to obtain at least one succeeding tag resource associated with the at least one succeeding tag; and generate a violation record including the at least one succeeding tag source, violated content security policy, and a preceding tag source.

In some embodiments, a violation analyzing module configured to apply the at least one content security policy to one or more scenarios; and an evaluating module configured to evaluate the at least one succeeding tag in the one or more scenarios, wherein the succeeding tag processing module is further configured to determine whether the at least one content security policy performs consistently across the one or more scenarios; if the at least one content security policy performs consistently across the one or more scenarios, generate a whitelisted source corresponding to the at least one succeeding tag; and store the whitelisted source in a database.

According to yet another embodiment of the present teaching, a non-transitory machine-readable medium having information recorded thereon for blocking malicious third party site tagging using content security policy (CSP), wherein the information, when read by the machine, causes the machine to perform the following: receiving from a user, a request to access a web page; obtaining a page resource associated with the web page; adding one or more tags to the page resource; interpreting one or more tag sources corresponding to the one or more tags, respectively; constructing at least one content security policy based on the one or more tag sources; enforcing the at least one content security policy on the page resource; and presenting to the user, the web page in accordance with the enforced at least one content security policy.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 illustrates another exemplary embodiment of a system diagram for blocking malicious site tagging using CSP, according to an embodiment of the present teaching;

DETAILED DESCRIPTION

Figure 1:
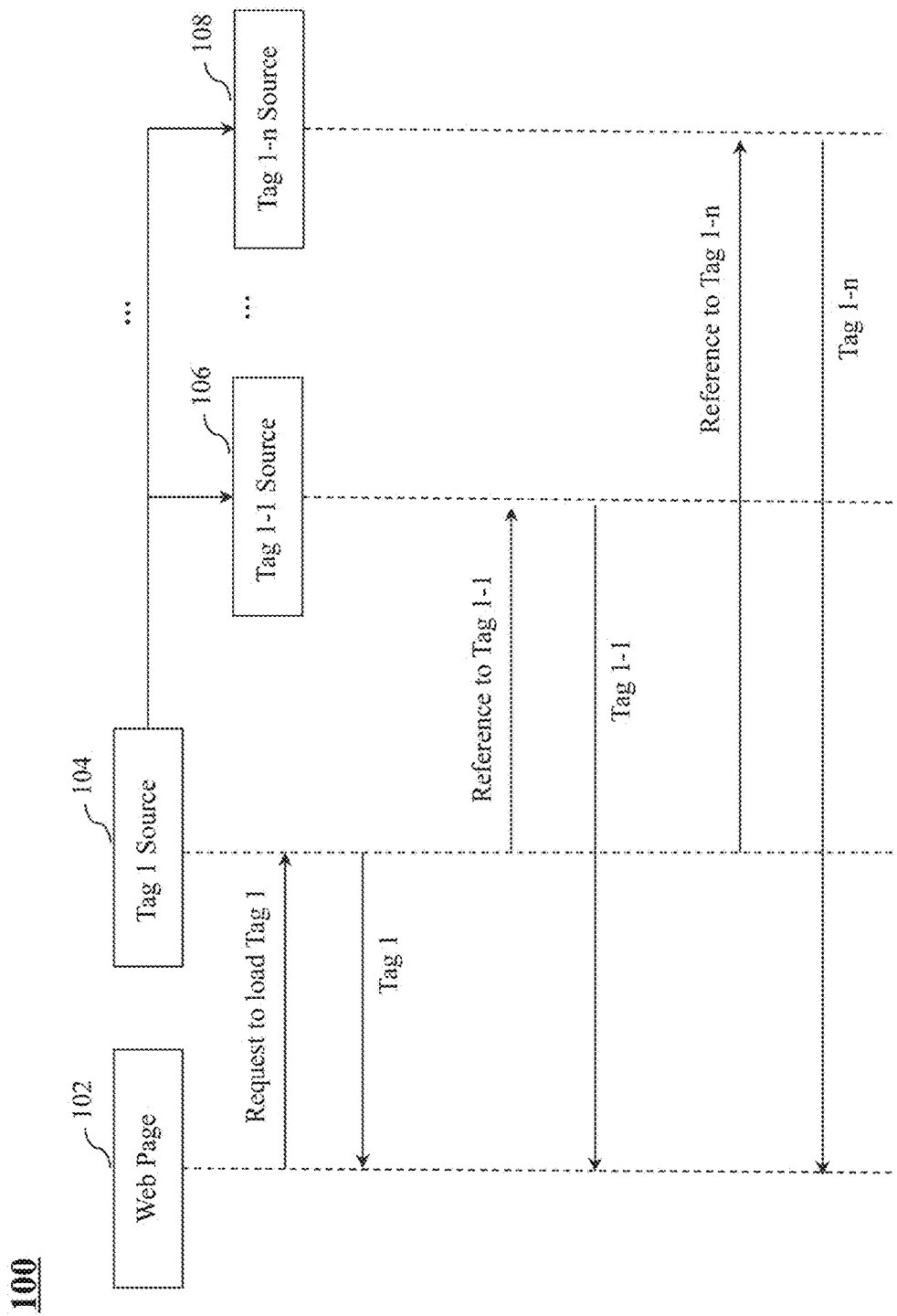
FIG. 1 illustrates an exemplary tag loading process in the prior art.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching applies CSP that is commonly known to help solve the problem of cross-site-scripting (XSS) to control the source origins of the third party tags instrumented on the publisher web page. The resources such as frames, image pixels and JavaScript used for the third party site tagging can be restricted to just the domains whitelisted by the publisher. According to the present teaching, CSP may be performed in an enforced mode, where when a third party tag attempts to load a script directing to a non-whitelisted domain, the non-whitelisted domain will be instantly blocked and content will not be loaded to the publisher web page due to the defined policies. Therefore, potential data leakage from the publisher or malicious tampering of the content of the publisher web page can be effectively avoided. Yet in another embodiment of the present invention, CSP may be performed in a report-only mode to be able to test the policies before enforcing the policies to ensure that CSP does not break any functionality on the publisher web page. Violating source origins, i.e., domains may be reported via HTTP POST request to a report-uri directive. The violation reports generated by the CSP report-only mode may be leveraged by the publisher to determined occurrence of adware and malware as the reports exactly delineates resources that are not whitelisted but got loaded on the publisher web page. It further gives the publisher an opportunity to restrict the web page and the third party site tags to just the tags that have been whitelisted through a thorough vetting process, and thus guarantees a strong agreement with the third parties.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 2:
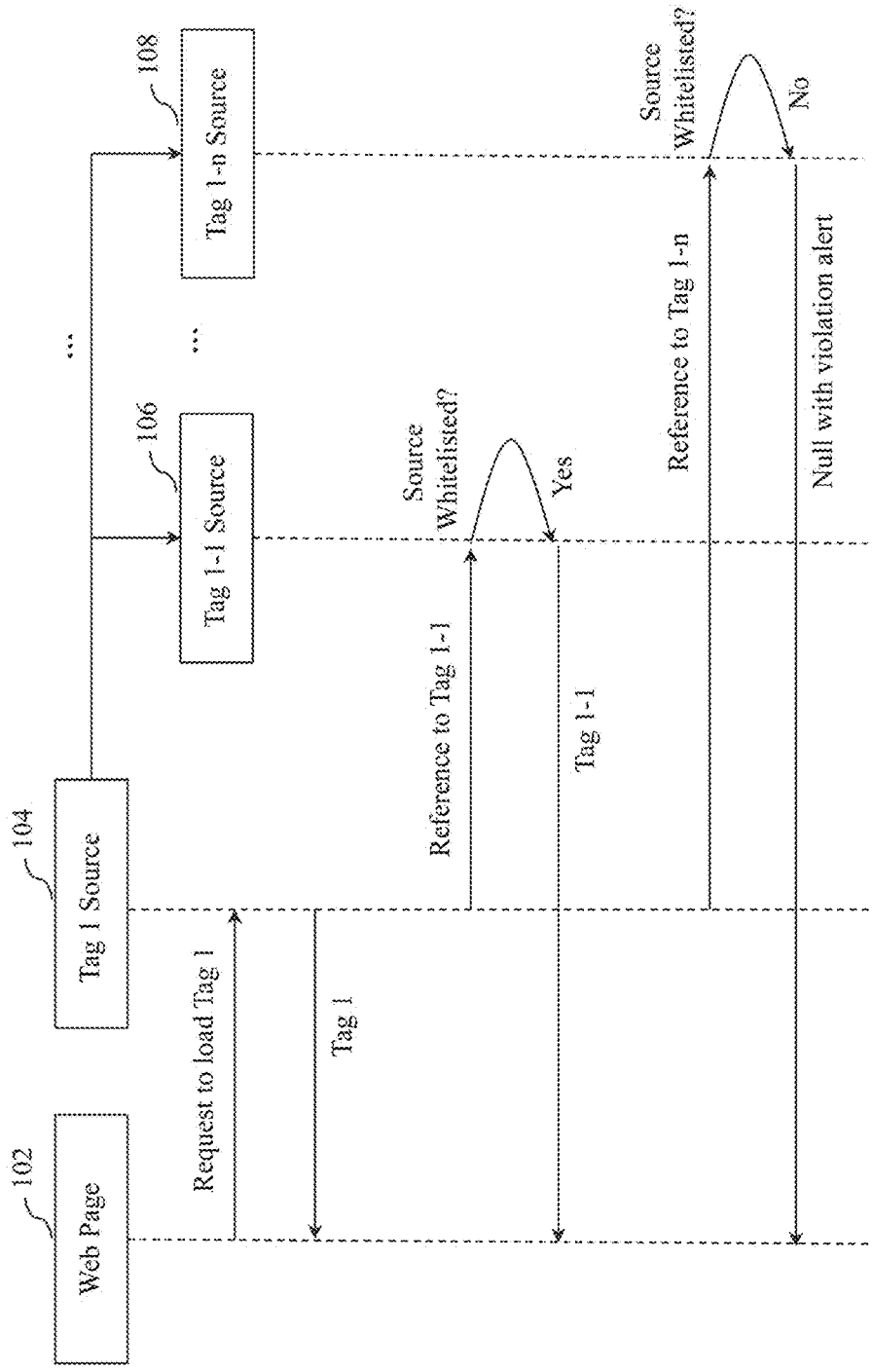
FIG. 2 illustrates an exemplary embodiment of a tag loading process, according to an embodiment of the present teaching.

FIG. 2 illustrates an exemplary embodiment of a tag loading process, according to an embodiment of the present teaching. According to the illustrated embodiment, a web page 102 may host a plurality of tag sources including Tag 1 source 104. The JavaScript of the Tag 1 source 104 may refer to one or more other sources from which succeeding tags can be loaded to the web page 102 such as Tag 1-1 source 106 and Tag 1-n source 108. When a request to load Tag 1 is sent, as the Tag 1 source 104 is an associated third party domain, content from the Tag 1 source 104 may be returned to the web page 102 if no further succeeding tags are included. However, if Tag 1 source 104 also directs to succeeding tag sources 106 and 108, further security checks may be performed on Tag 1-1 source 106 and Tag 1-*n* source 108 via an enforced CSP. If Tag 1-1 source 106 is defined in the policies as a secure source, the Tag 1-1 source 106 returns the content of the succeeding Tag 1-1 to be loaded on the web page. On the contrary, if Tag 1-*n* source 108 is not defined in the policies as a secure source, Tag 1-*n* source 108 is blocked and null content is returned to the web page along with a violation alert to the web page administrator.

In some embodiments, the security check on the tag sources may be performed via enforcing CSP, which checks the defined one or more policies associated with the publisher web page, and determine whether the origin of the tag source is a secure origin defined in the one or more policies. As the web page 102 has no control of the JavaScript of the tag source 104, the security check on the tag sources ensures that the JavaScript complies with the agreement between the web page and the third parties. If the JavaScript of the tag sources has been changed to piggyback another source that is not defined in the one or more policies, the source is blocked and content from that source is not loaded on the web page. In yet another embodiment, if the JavaScript of the tag sources is tampered by a fourth party for malicious attack of the web page, the security check blocks the undefined source and any content noncompliance with the third party agreement from being loaded.

In some embodiments, the web page may be a publisher web page that integrates third party advertisements to be displayed on the content or elements of the publisher web page. The numerous tag sources may refer to the domains of the third party advertisements, the third party content providers, other entities that are authorized to tag the publisher web page, or other entities that are allowed to access and analyze data associated with the publisher web page, etc. The numerous tag sources may have scaled agreements with the web page according to the services contracted between the tag sources and the web page. The domains of the numerous tag sources that have agreements with the web page may be stored in a whitelisted domain database. A content security policy associated with the web page may be constructed to define one or more whitelisted domains as secure origins. In some embodiments, multiple policies may be constructed associating with the web page.

According to the embodiments illustrated in FIG. 2, the CSP is performed in an enforced mode, where unauthorized tag sources may be immediately detected and blocked before the tag is actually loaded on the web page. In some embodiments, if for rendering third party content, the user-agent creates an iframe nested in a web page protected by the CSP policy, the iframe must enforce its own policy restricting content to just domains allowed to run in the iframe since iframes are created in a separate browsing context. For example, third party content is embedded in an iframe that is hosted on a Yahoo! domain. Thus, when a Yahoo! property is setting a CSP header, it will restrict iframe inclusion to just the Yahoo! domain, and the iframe will have its own policy restricting the content (which for third party, could be a script, an image or an iframe tag) to just the whitelisted domains.

Further, in addition to fetching a resource from within another resource, third party tags may often at times do a 302 redirect to a fourth party tag, where a 302 Found is a common way of performing a URL redirection. A sub-resource loading example is detailed as below.

If a user is loading a third party JavaScript with the following contents:

```
// 3rd-party.js
...
// include a 4th-party js
$.getScript('/path/to/imported/4th-party-script.js', function( )
{
// 4th-party script is now loaded and executed.
});
...
```

A 302 example requests:
GET/3rd-party.js HTTP/1.1
Host: www.3rd-party.com
Further, 3rd-party.com responds as well as the server:
HTTP/1.1 302 Found
Location: http://4th-party.com/something.js
Further, the resource will be loaded from a fourth party web site only if the fourth party domain is whitelisted in the CSP policy.

In some embodiments, one or more CSPs may be enforced in a hierarchical structure, where a first set of the one or more CSPs may be enforced at a page level and/or at least a second set of the one or more CSPs may be enforced at an element level of the web page based on different tag instrumenting schemes of the publishers. For example, Yahoo! leverages safeframes for JavaScript and tags are instrumented as 1×1 image pixels. Thus, the CSP may be enforced at both iframe and page level; however, the CSPs associated with the iframe may be constructed independently from the web page that the iframe nests on. In some embodiments, the first set of CSPs enforced at the page level and the second set of CSPs enforced at the element level may define at least one same whitelisted source; yet in some other embodiments, the first set of CSPs and the second set of CSPs may define completely different whitelisted sources. In some embodiments, the element such as iframe may be considered as a full-functioned web page that is configured with a separate set of CSPs and can be incorporated to any web page as a third party tag.

In some embodiments, elements of the web page may comprise textual information, static images, animated images, audio, video, interactive information associated with the application, cross-application interactive information, tags, scripts, rich site summary (RSS) feeds, frames, etc.

According to the present teaching, the enforced mode CSP can effectively protect the web page from being attacked by any malicious entities that are not associated with the web page, and protect the business data and user sensitive data of the web page from leaking to unauthorized entities.

Figure 3:
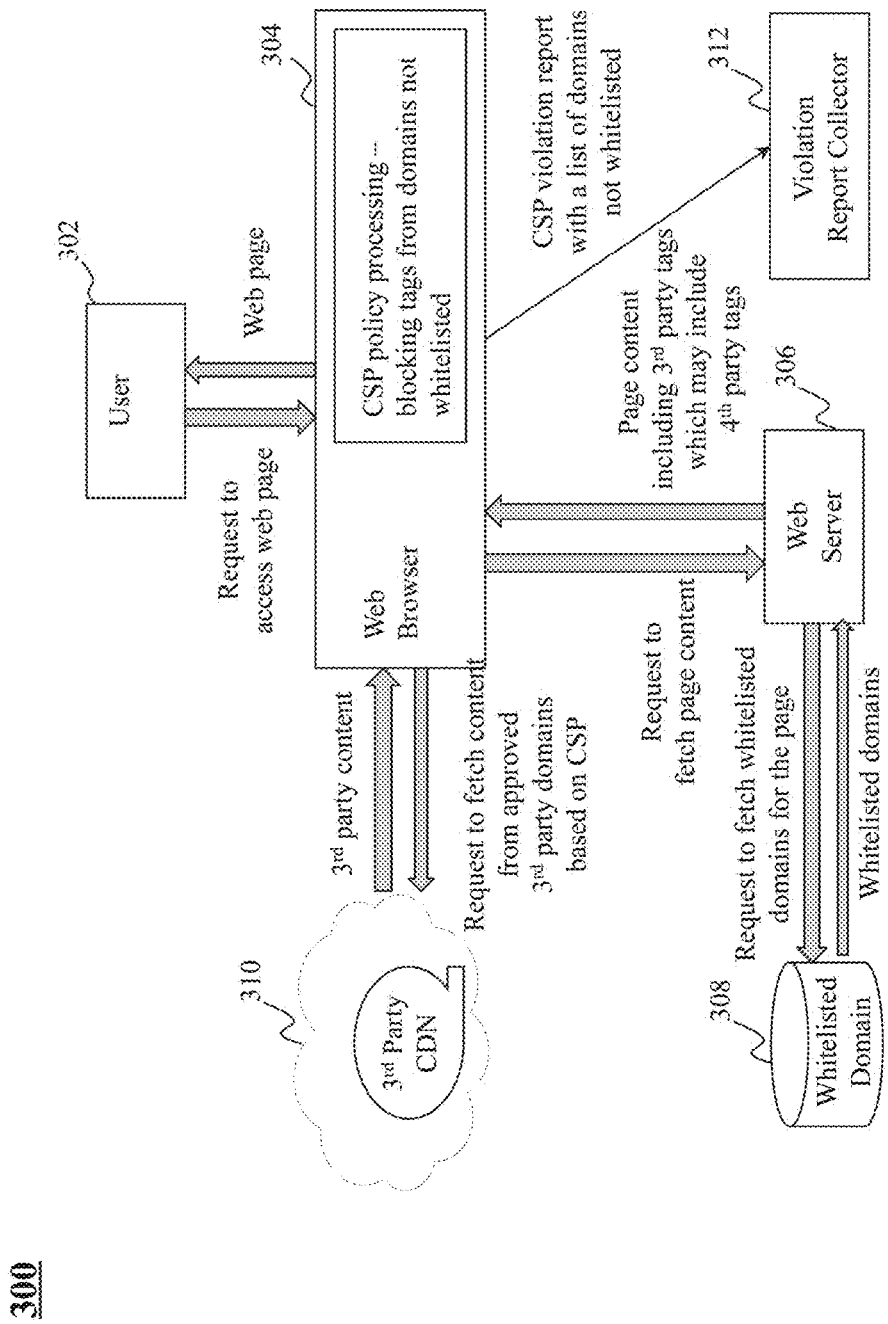
FIG. 3 illustrates another exemplary embodiment of a tag loading process, according to an embodiment of the present teaching.

FIG. 3 illustrates another exemplary embodiment of a tag loading process, according to an embodiment of the present teaching. According to this embodiment, a user 302 may send a request to access a web page through a web browser 304 installed on the user's device. The web browser may further send a request to fetch page content to a web server 306. The web server 306 may inquiry the whitelisted domain 308, and return the page content to be displayed in the web browser 304. The returned page content may include whitelisted third party tags, which may further piggyback fourth party tags. A CSP may be enforced on the web page before loading the content to the web browser 304 by blocking tags from domains not whitelisted. A CSP report with a list of domains not whitelisted may be sent to a violation report collector 312 for storing or further evaluation. After the CSP is enforced, a request to fetch content from approved third party domains may be generated, and corresponding content from the approved domains may be obtained from a third party content delivery network (CDN) 310.

Figure 4:
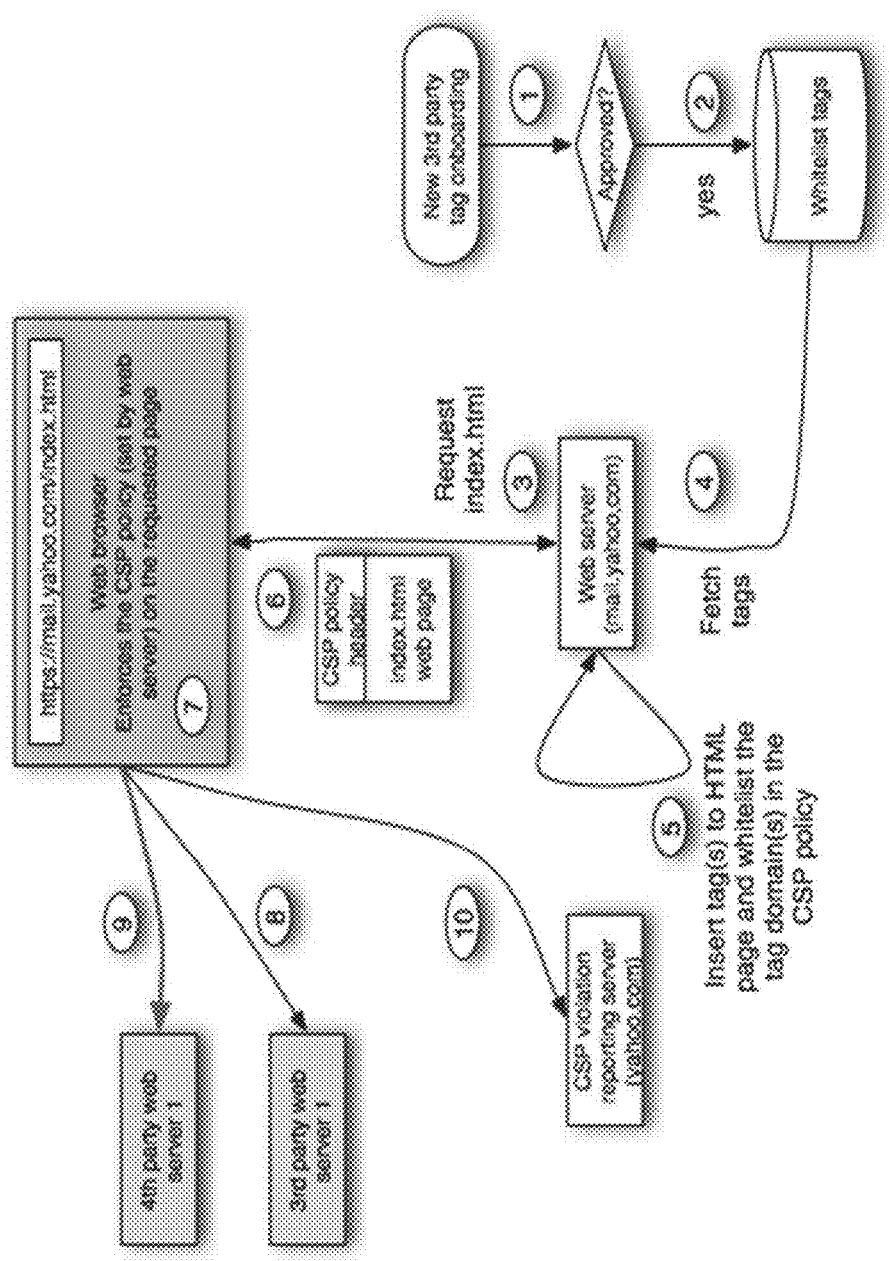
FIG. 4 illustrates yet another exemplary embodiment of a tag loading process, according to an embodiment of the present teaching.

FIG. 4 illustrates yet another exemplary embodiment of a tag loading process, according to an embodiment of the present teaching. A tag loading process according to some embodiments may start with a new third party tag onboarding request to a hosting web page. Once the third party tag onboarding request is approved, the third party tag may be whitelisted and stored in a database for future reference. When a web browser sends a request to load the page source, i.e., index.html, the web server may fetch the whitelisted tags, insert them to the page source and whitelist the tag domains in the CSP policy. The page source with implemented CSP policy is returned to the web browser, where the CSP is enforced to determine any chained fourth party tags are from a whitelisted domain. Based on the CSP enforcement, the web browser may fetch content from whitelisted third party and/or fourth party web server, and block domains not whitelisted. Violations of CSP may be forwarded to the CSP violation reporting server for storing or further analysis.

According to the embodiments illustrated in FIG. 4, the CSP is performed in a report-only mode, where violations of the third party tagging are closely monitored without breaking any functionality of the web page. In some embodiments, for a same security policy, different behaviors may be observed across browsers or platforms. Therefore, before running CSP in an enforced mode that could potentially block required content on the web page, the constructed content security policy is tested across browsers or platforms in one or more scenarios. If the violations observed are expected and the behaviors associated with the policy are consistent across all browsers or platforms, the CSP may be turned to perform in the enforced mode. In some embodiments, the one or more scenarios to test the content security policy may be types of browsers implemented on different platforms such as Internet Explorer (IE), Mozilla Firefox, Safari, Chrome, etc. The platforms may include operations systems implemented on personal computer, server computer, portable device and mobile phone such as Windows, Mac operating system, Android, iOS, Unix, Unix-like operating system, etc. As it can be very risky if a content security policy associated with a publisher web page is misconfigured or too permissive, the publisher may leverage the violation report generated during the report-only mode to determine occurrences of adware and malware that impact the user experience on the web page.

Figure 5:
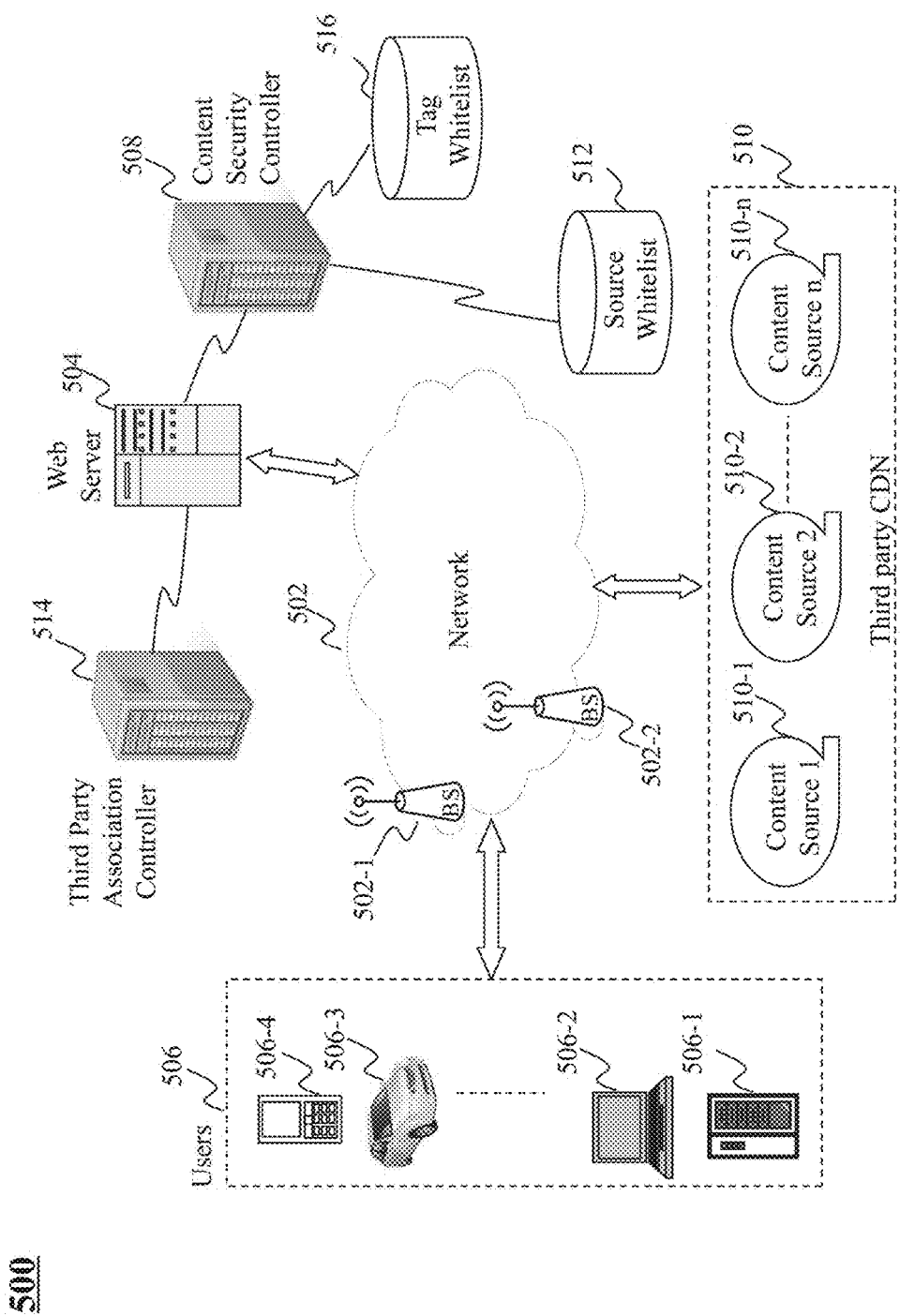
FIG. 5 illustrates an exemplary embodiment of a system diagram for blocking malicious site tagging using CSP, according to an embodiment of the present teaching.

FIG. 5 illustrates an exemplary embodiment of a system diagram for blocking malicious site tagging using CSP, according to the present teaching. The system for malicious site tagging using CSP may include a web server 504, one or more users 506, a content security controller 508, a third party content delivery network 510 with a plurality of content sources, a source whitelist database 512, a tag whitelist database 516, a third party domain controller 514, and a network 502. The network 608 may be a single network or a combination of different networks. For example, the network 608 may be a local area network (LAN), a wide area network (WAN), a public network, a private network, a proprietary network, a Public Telephone Switched Network (PSTN), the Internet, a wireless network, a virtual network, or any combination thereof. The network 502 may also include various network access points, e.g., wired or wireless access points such as base stations or Internet exchange points 502-1, . . . , 502-2, through which a content source may connect to the network 502 in order to transmit information via the network 502.

The web server 504 may be any entities that hosts content of the web page and a plurality of advertisement and/or tags from associated third parties on its asset (e.g., web page or application). The advertisement and/or tags may be presented to the users 506 when the user access the web page or launch the application. The users 506 may be of different types such as users connected to the network 502 via desktop computers 506-1, laptop computers 506-2, a built-in device in a motor vehicle 506-3, or a mobile device 506-4. When a user accesses the web page or the application, requests to load the contents to be display to the user may be sent to the web server 504. To ensure the contents of the web page or the application are loaded from secure origins, which may be contracted third parties with the web server, a CSP vetting process may be performed on the numerous source origins (e.g., content source 510-1, 510-2, . . . , 510-n) associated with a home page of the web page or the application. In another embodiment, after the home page of the web page or the application is successfully launched, the user accesses an element of the web page or the application, such as an advertisement, a tag, a frame, etc., the CSP vetting process may be further performed on the source origins associated with the particular element.

In some embodiments, the CSP vetting process may be performed via the content security controller 508, which may utilize the information retrieved from the third party domain controller 514, the source whitelist DB 512 and the tag whitelist DB 516. According to the illustrated embodiment, the content security controller 508, the third party domain controller 514, the source whitelist DB 512 and the tag whitelist DB 516 may serve as a backend system for examining the plurality of content source origins and blocking malicious third party contents or tags from being loaded to the web page or application.

FIG. 6 illustrates another exemplary embodiment of a system diagram for blocking malicious site tagging using CSP, according to the present teaching. The system environment illustrated in FIG. 6 is similar to FIG. 5, except that the content security controller 508, the third party domain controller 514, the source whitelist DB 512 and the tag whitelist DB 516 my act as independent service providers that directly connected to network 502.

Figure 7A:
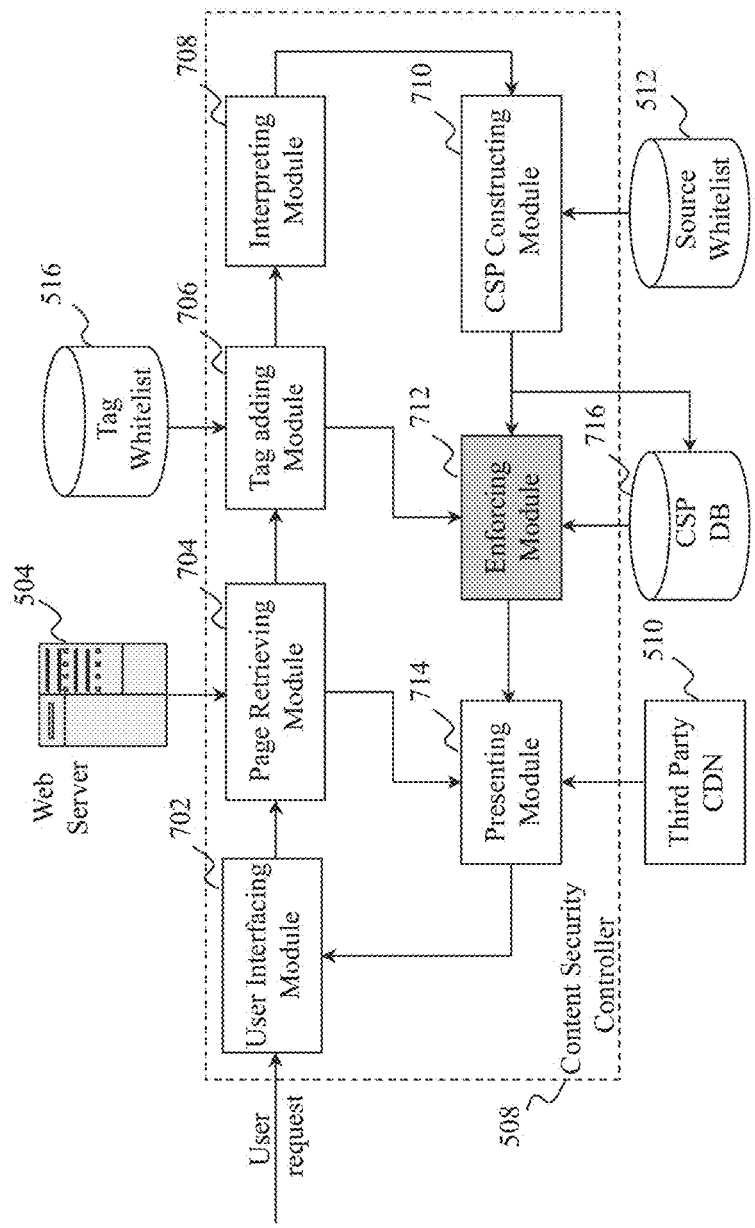
FIG. 7A illustrates an exemplary embodiment of a system diagram of a content security controller shown in FIGS. 5 and 6, according to an embodiment of the present teaching.

FIG. 7A illustrates an exemplary embodiment of a system diagram of a content security controller shown in FIGS. 5 and 6, according to an embodiment of the present teaching. The system may include a user interfacing module 702, a page retrieving module 704, a tag adding module 706, an interpreting module 708, a CSP constructing module 710, an enforcing module 712, a present module 714, and a CSP database 716. The user interfacing module 702 may be configured to receive a user request to access a web page hosted on the web server 504. Upon receiving the user request, the page retrieving module 704 may obtain a page source, i.e., index.html, associated with the web page from the web server 504. The obtained page source may be forwarded to the tag adding module 706 where one or more whitelisted third party tags are added to the page source. The interpreting module 708 may be configured to interpret the one or more tag sources corresponding to the one or more third party tags, respectively. The CSP constructing module 710 may be configured to construct at least one content security policy based on the one or more interpreted tag sources by referring to a source whitelist DB 512. The constructed at least one CSP may be stored in the CSP DB 716, and further forwarded to the enforcing module 712. The enforcing module 712 may execute the CSP on the integrated page source, i.e., the page source with one or more whitelisted third party tags. The presenting module 714 may be configured to present the web page to the user in accordance with the enforced at least one CSP via retrieving the contents from the third party CDN 510.

According to the embodiment illustrated in FIG. 7A, CSP is performed in an enforced mode, where when a third party tag attempts to load a script directing to a non-whitelisted source, the non-whitelisted source will be instantly blocked and content will not be loaded to the web page due to the defined policies.

In some embodiments, the tag whitelist DB 516 may be generated upon request to board the tags on the web page from the associated third parties. Although the tag whitelist DB 516 may be administrated by the web page, the sources of those whitelisted tags, i.e., the JavaScript, are hosted on the respective third party domains. Therefore, in one aspect that the web page is generally protected via the third party agreements, the enforcement of the CSPs yet can further scrutinize whether a whitelisted tag piggybacks one or more non-whitelisted tags that may potentially cause damage to the web page.

Figure 7B:
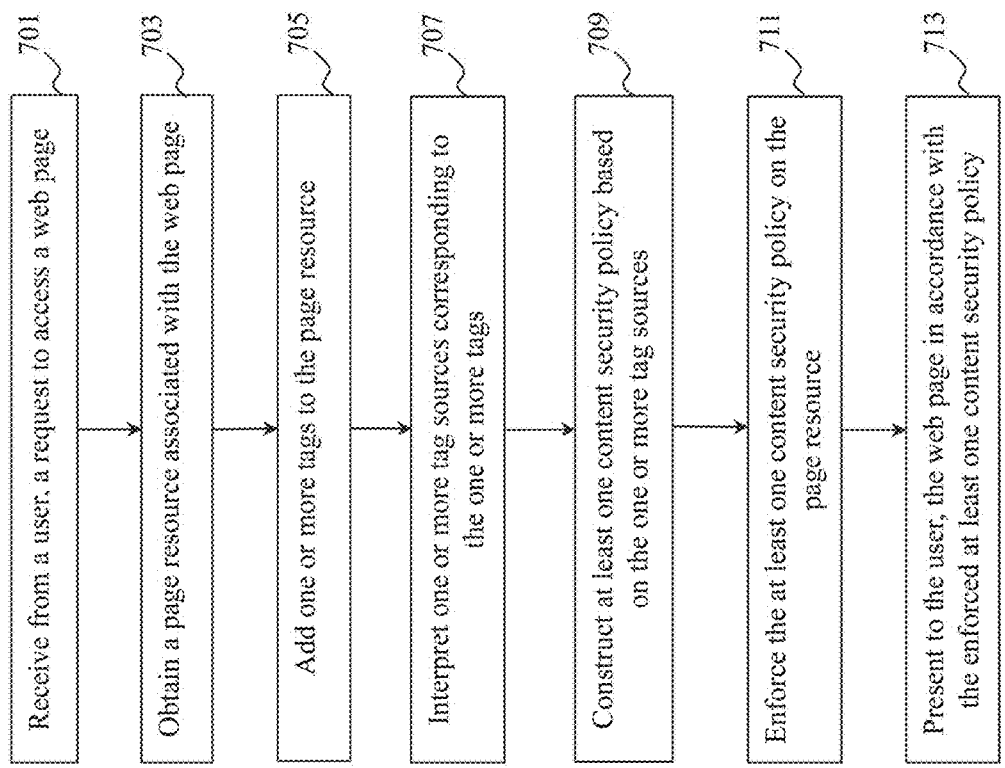
FIG. 7B illustrates an exemplary flowchart of the process for blocking malicious site tagging using CSP, according to an embodiment of the present teaching.

FIG. 7B illustrates an exemplary flowchart of the process for blocking malicious site tagging using CSP, according to an embodiment of the present teaching. The process for blocking malicious site tagging using CSP may include receiving from a user, a request to access a web page 701; obtaining a page resource associated with the web page 703; adding one or more tags to the page resource 705; interpreting one or more tag sources corresponding to the one or more tags, respectively 707; constructing at least one content security policy based on the one or more tag sources 709; enforcing the at least one content security policy on the page resource 711; and presenting to the user, the web page in accordance with the enforced at least one content security policy 713.

Figure 8A:
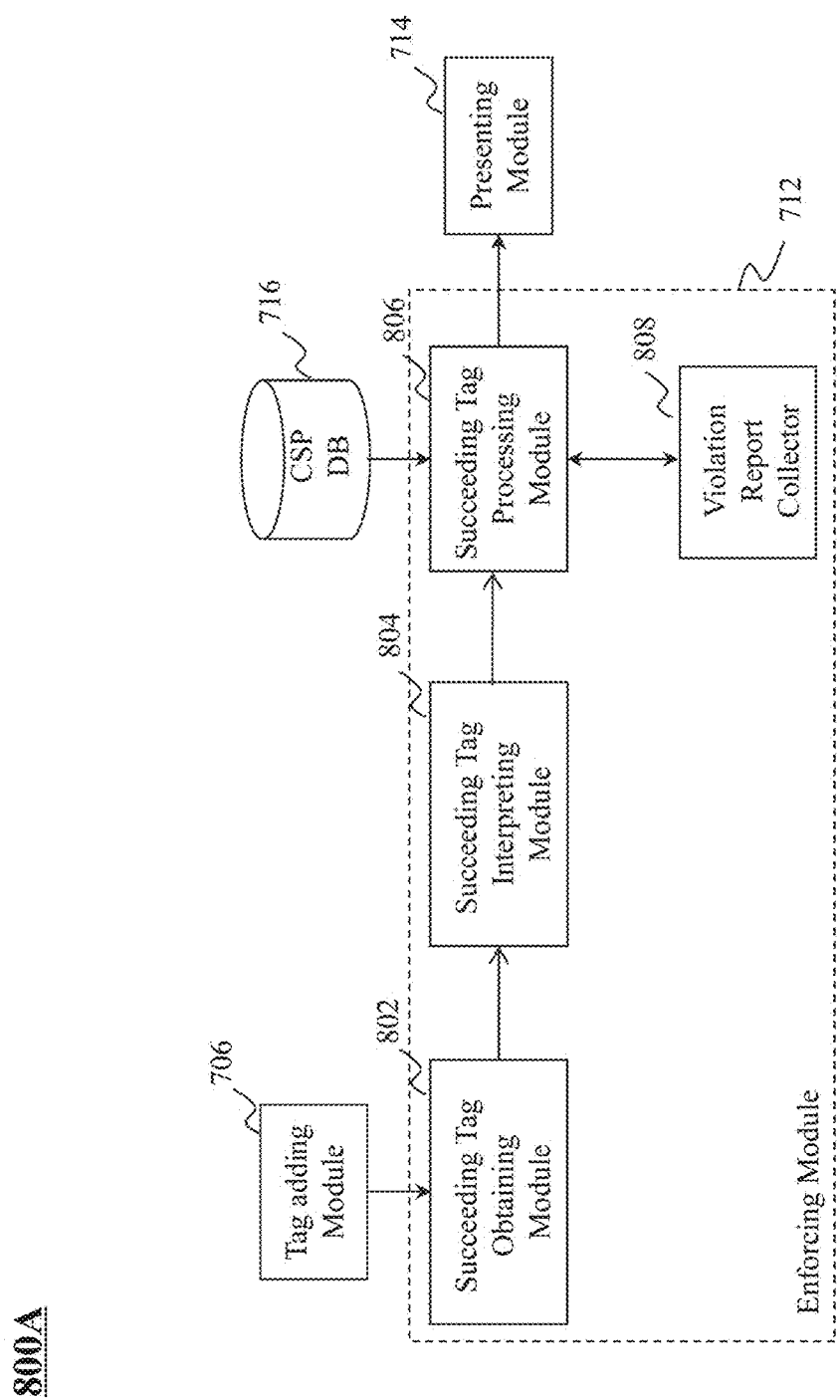
FIG. 8A illustrates an exemplary embodiment of a system diagram of an enforcing module shown in the system of FIG. 7A, according to an embodiment of the present teaching.

FIG. 8A illustrates an exemplary embodiment of a system diagram of an enforcing module shown in the system of FIG. 7A, according to an embodiment of the present teaching. The system diagram of an enforcing module may include a succeeding tag obtaining module 802, a succeeding tag interpreting module 804, a succeeding tag processing module 806, and a violation report collector 808. The succeeding tag obtaining module 802 may be configured to detect whether the one or more whitelisted tags refer to at least one succeeding tag, and obtain the at least one succeeding tag if it exists. The succeeding tag interpreting module 804 may be configured to interpret the source associated with the at least one succeeding tag, and forward the interpreted succeeding tag source for processing. The succeeding tag processing module 806 may be configured to determine whether the at least one succeeding tag is also from a whitelisted source by referring to the CSP DB. If it is determined that the at least one succeeding tag is also from a whitelisted source, the succeeding processing module 806 may further obtain content from the at least one succeeding tag source, and forward it to the presenting module 714. If it is determined that the at least one succeeding tag is not from a whitelisted source, the succeeding processing module 806 may block the at least one succeeding tag source, and also generates a violation alert to be stored in the violation report collector 808.

In some embodiments, all the succeeding tags are checked by the browser against the policy returned by the web server. If any is violating the policy, that tag does not get loaded and a report is sent to a violation report collector or a violation report collecting server with the violating tag, the policy it was violating, the web page on which it was getting loaded, the policy set for the web page, and the referrer (i.e., address of a referring page that linked to the web page) for the web page which was loading the tag.

As the CSP in the embodiment shown in FIG. 8A is an enforced mode, any fourth party tag that is chained to the approved third party tag can be instantly detected and scrutinized. Thus, even if the JavaScript of the third party tag is tampered by a malicious fourth party or entity, the web page hosting the third party tag can be protected from loading unsafe content through the enforced CSP.

Figure 8B:
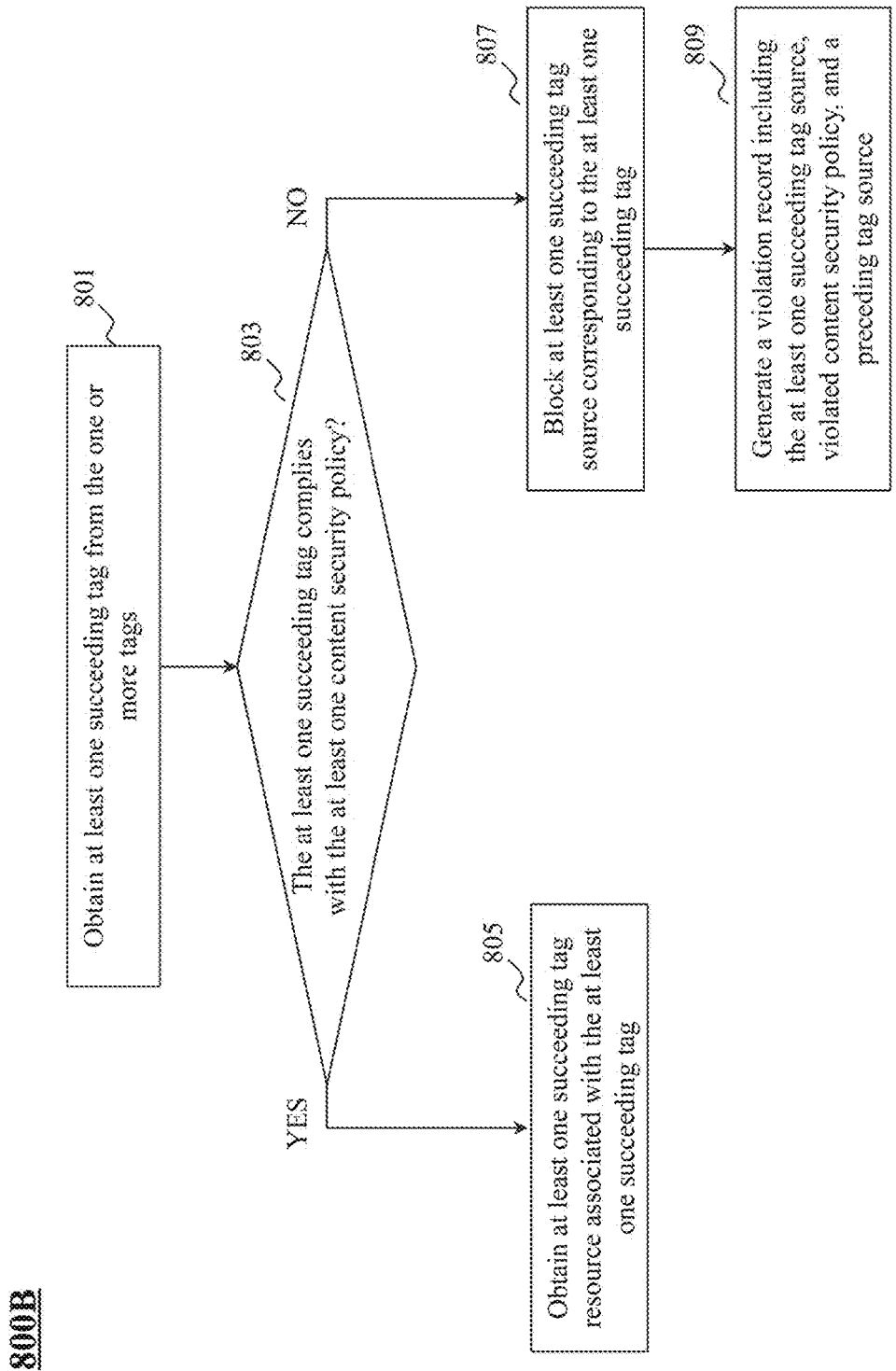
FIG. 8B illustrates another exemplary flowchart of the process for blocking malicious site tagging using CSP, according to an embodiment of the present teaching.

FIG. 8B illustrates another exemplary flowchart of the process for blocking malicious site tagging using CSP, according to an embodiment of the present teaching. The process for blocking malicious site tagging using CSP according to the illustrated embodiment may include obtaining at least one succeeding tag from the one or more tags 801, determining whether the at least one succeeding tag complies with the at least one content security policy 803; if the at least one succeeding tag complies with the at least one content security policy, obtaining at least one succeeding tag resource associated with the at least one succeeding tag 805; and if the at least one succeeding tag does not comply with the at least one content security policy, blocking at least one succeeding tag source corresponding to the at least one succeeding tag 807; and generating a violation record including the at least one succeeding tag source, violated content security policy, and a preceding tag source 809.

Figure 9A:
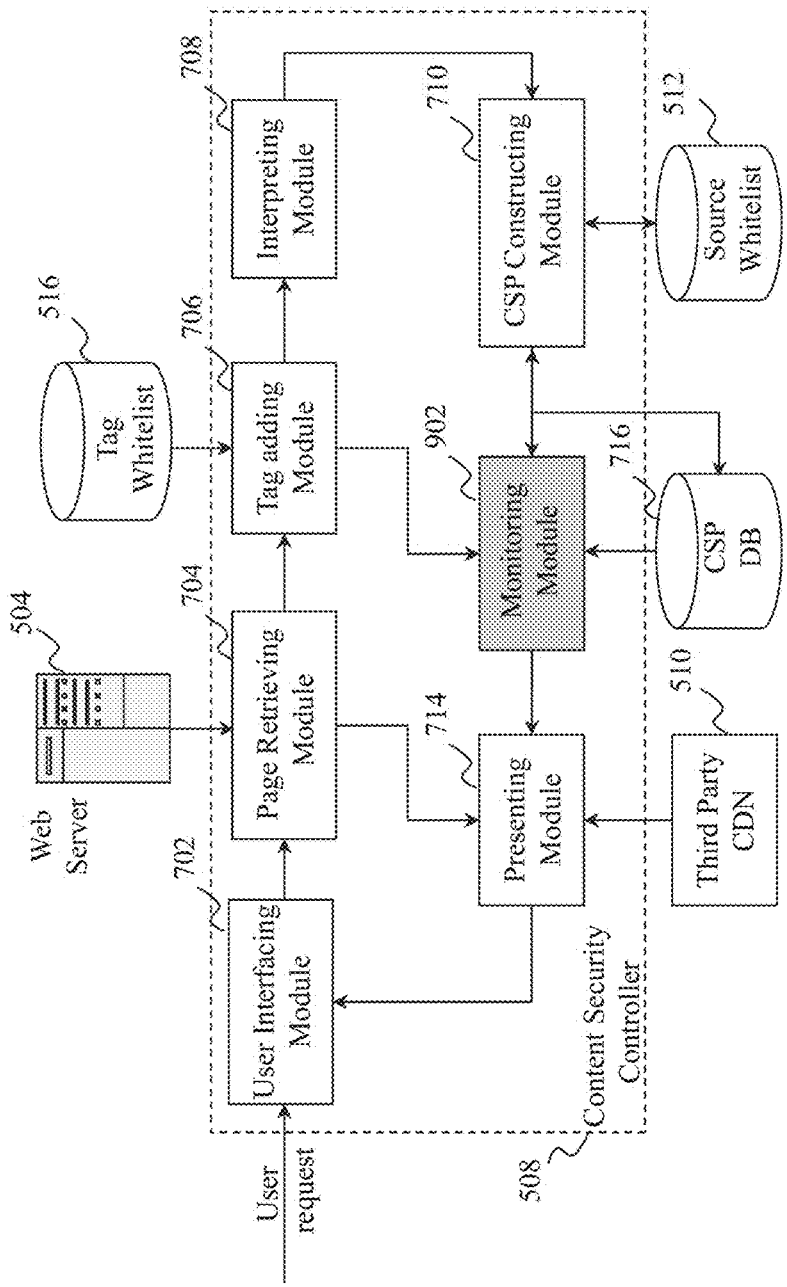
FIG. 9A illustrates another exemplary embodiment of a system diagram of a content security controller shown in FIGS. 5 and 6, according to an embodiment of the present teaching.

FIG. 9A illustrates another exemplary embodiment of a system diagram of a content security controller shown in FIGS. 5 and 6, according to an embodiment of the present teaching. CSP in this embodiment is performed in a report-only mode to be able to test the policies before enforcing the policies to ensure that CSP does not break any functionality on the publisher web page. The system elements of the report-only mode CSP is similar to the enforced mode CSP, except that the report-only mode CSP may apply a monitoring module 902 instead of an enforcing module 712. Unlike in the enforced mode where not whitelisted fourth party tags are instantly blocked, the report-only mode CSP may allow the not whitelisted fourth party tags to be boarded on the web page. The report-only mode CSP may monitor the behavior of the constructed CSP over the whitelisted fourth party tags in different scenarios, and determine whether the fourth party tags can be whitelisted in the future. Therefore, the report-only mode CSP may provide a grace period to the web page, i.e., a publisher, to analyze the constructed CSP before actually enforcing it, which helps the web page to leverage the violation records to determine occurrences of adware and malware.

Figure 9B:
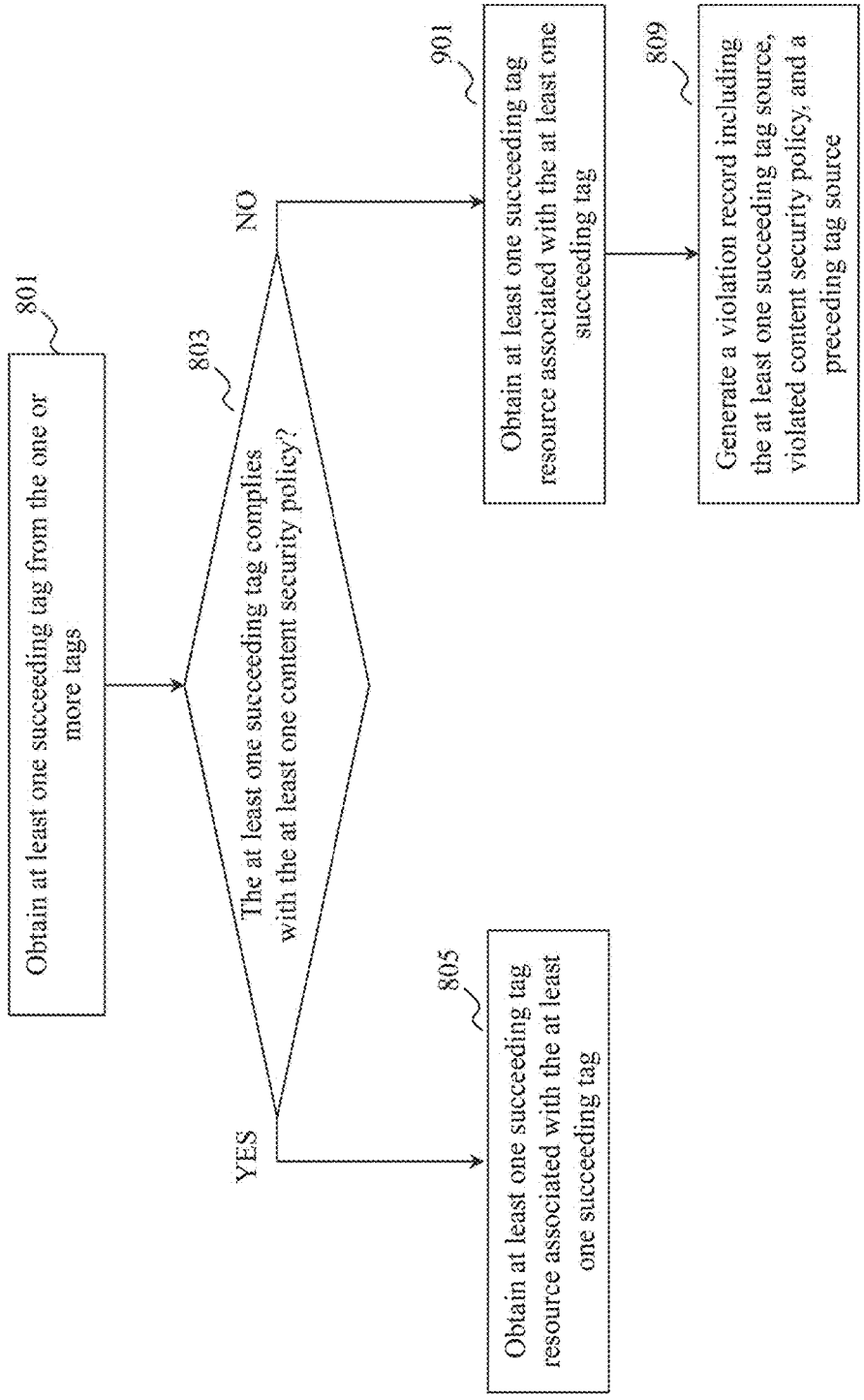
FIG. 9B illustrates an exemplary flowchart of the process for blocking malicious site tagging using CSP, according to an embodiment of the present teaching.

FIG. 9B illustrates an exemplary flowchart of the process for blocking malicious site tagging using CSP, according to an embodiment of the present teaching. The process for blocking malicious site tagging using CSP according to the illustrated embodiment may include obtaining at least one succeeding tag from the one or more tags 801, determining whether the at least one succeeding tag complies with the at least one content security policy 803; if the at least one succeeding tag complies with the at least one content security policy, obtaining at least one succeeding tag resource associated with the at least one succeeding tag 805; and if the at least one succeeding tag does not comply with the at least one content security policy, obtaining at least one succeeding tag resource associated with the at least one succeeding tag 901; and generating a violation record including the at least one succeeding tag source, violated content security policy, and a preceding tag source 809.

Figure 10A:
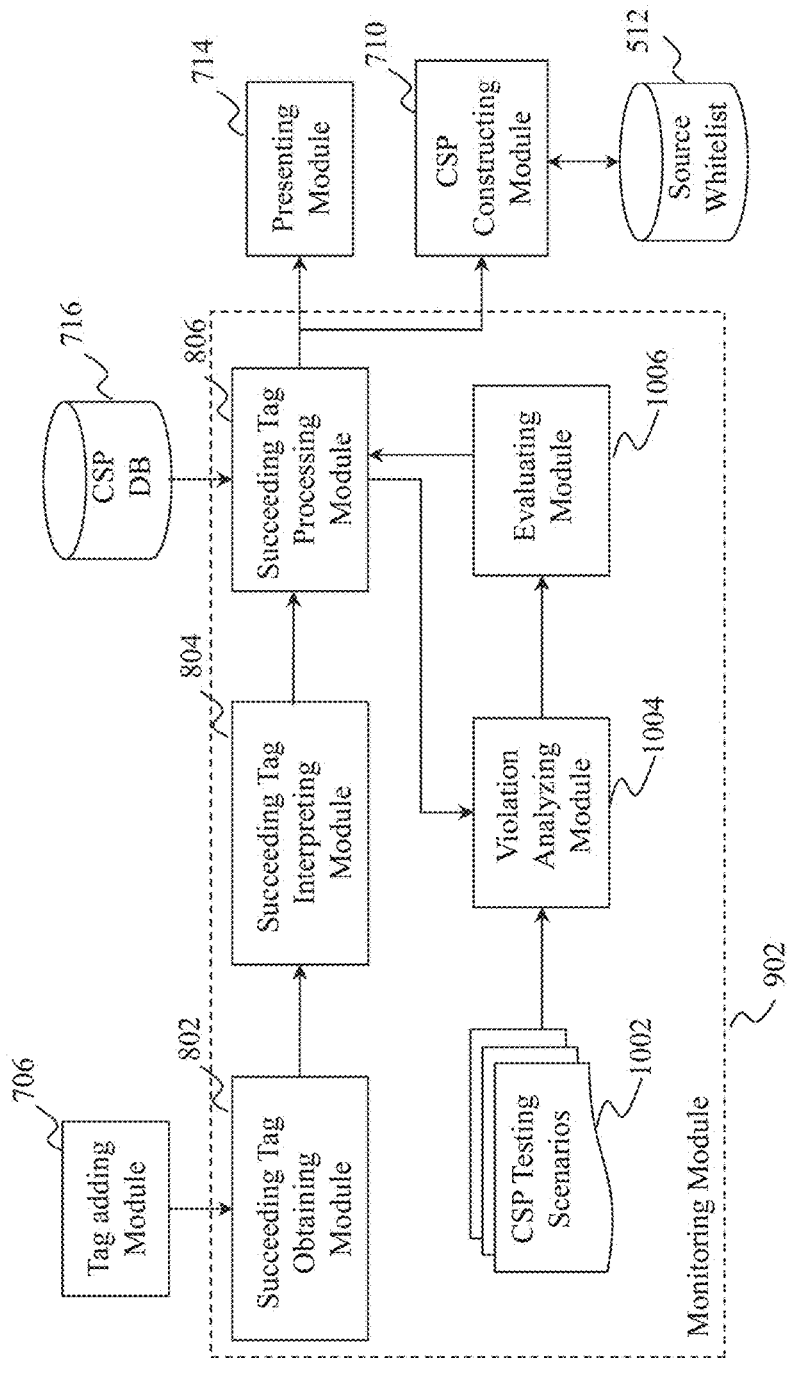
FIG. 10A illustrates an exemplary embodiment of a system diagram of a monitoring module shown in the system of FIG. 9A, according to an embodiment of the present teaching.

FIG. 10A illustrates an exemplary embodiment of a system diagram of a monitoring module shown in the system of FIG. 9A, according to an embodiment of the present teaching. The monitoring module in this embodiment may include a succeeding tag obtaining module 802, a succeeding tag interpreting module 804, a succeeding tag processing module 806, an evaluating module 1006, a violation analyzing module 1004, and a CSP testing scenarios 1002. In the report-only CSP, after the succeeding tag processing module 806 reports a violation, the succeeding tag source, the violated CSP, and a preceding tag source may be forwarded to the violation analyzing module 1004 for further testing. In some embodiments, the violated CSP over the succeeding tag source may be tested and evaluated in the evaluating module 1006 using one or more CSP testing scenarios 1002. If it is determined that the observed behaviors of the violated CSP over the succeeding tag source are consistent across different testing scenarios, the succeeding tag source may be forwarded to the CSP constructing module 710 to generate a whitelisted source. The generated whitelisted source corresponding to a safe fourth party tag may be further inserted into the source whitelist DB 512 for updating.

In some embodiments, if a violation report is sent to the violation report collecting server with a succeeding tag that violates the policy (and is not in the whitelist), the preceeding tag that the succeeding tag is nested may or may not be available to be sent together to the violation report collecting server, however, the preceeding tag may be obtained by debugging and re-executing the web page.

In some embodiments, the CSP testing scenarios may include but not limited to various navigating software/applications such as Internet Explorer (IE), Chrome, Firefox, Mozilla, Safari, Opera, etc., and various operating systems such as Windows, MAC, Unix and Unix-like operating systems, iOS, Android etc.

Figure 10B:
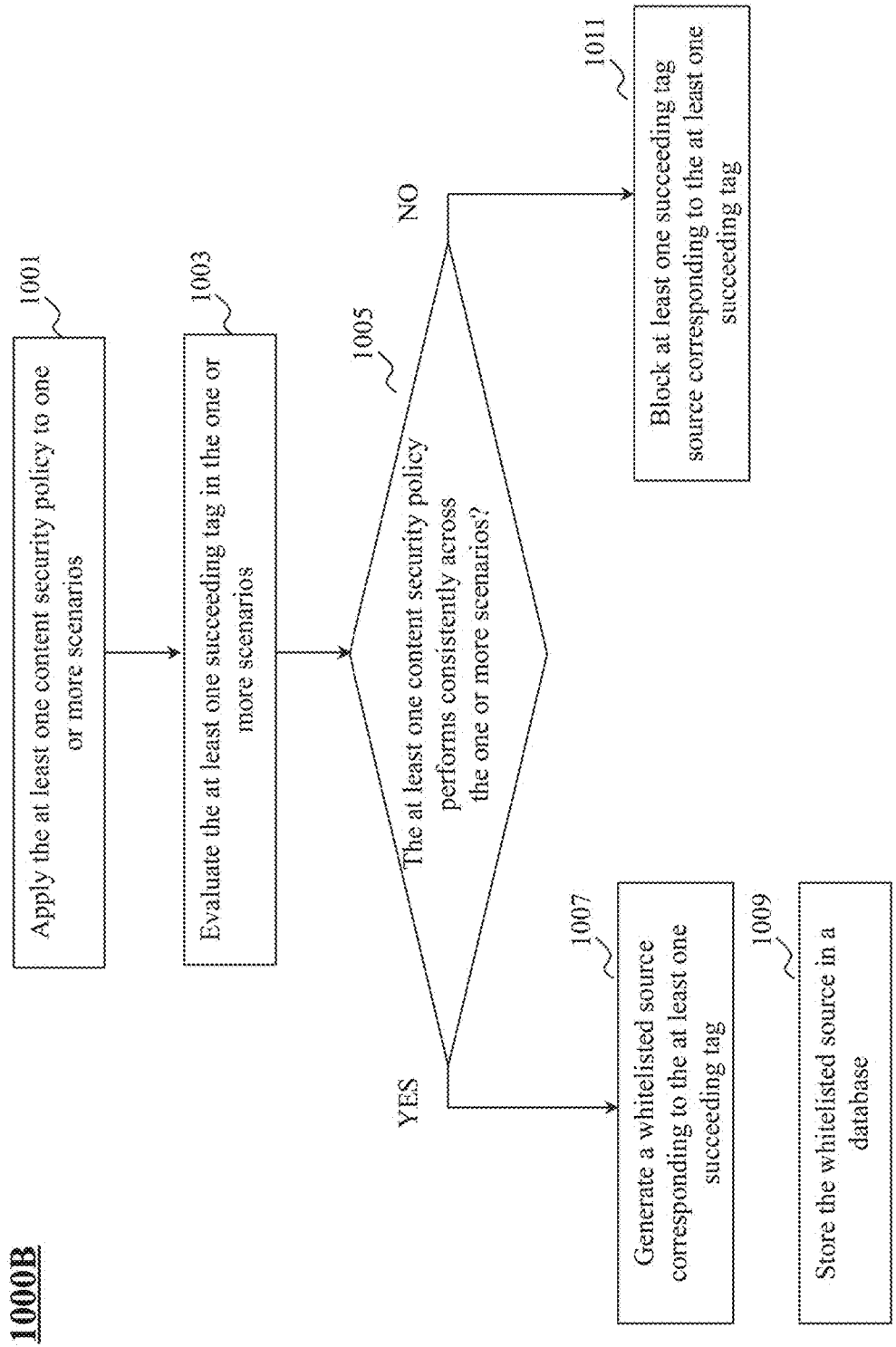
FIG. 10B illustrates another exemplary flowchart of the process for blocking malicious site tagging using CSP, according to an embodiment of the present teaching.

FIG. 10B illustrates another exemplary flowchart of the process for blocking malicious site tagging using CSP, according to an embodiment of the present teaching. The process for blocking malicious site tagging using CSP may include applying the at least one content security policy to one or more scenarios 1001; evaluating the at least one succeeding tag in the one or more scenarios 1003; determining whether the at least one content security policy performs consistently across the one or more scenarios 1005; if the at least one content security policy performs consistently across the one or more scenarios, generating a whitelisted source corresponding to the at least one succeeding tag 1007; and storing the whitelisted source in a database 1009; and if the at least one content security policy does not perform consistently across the one or more scenarios, blocking the at least one succeeding tag source corresponding to the at least one succeeding tag 1011.

Figure 11A:
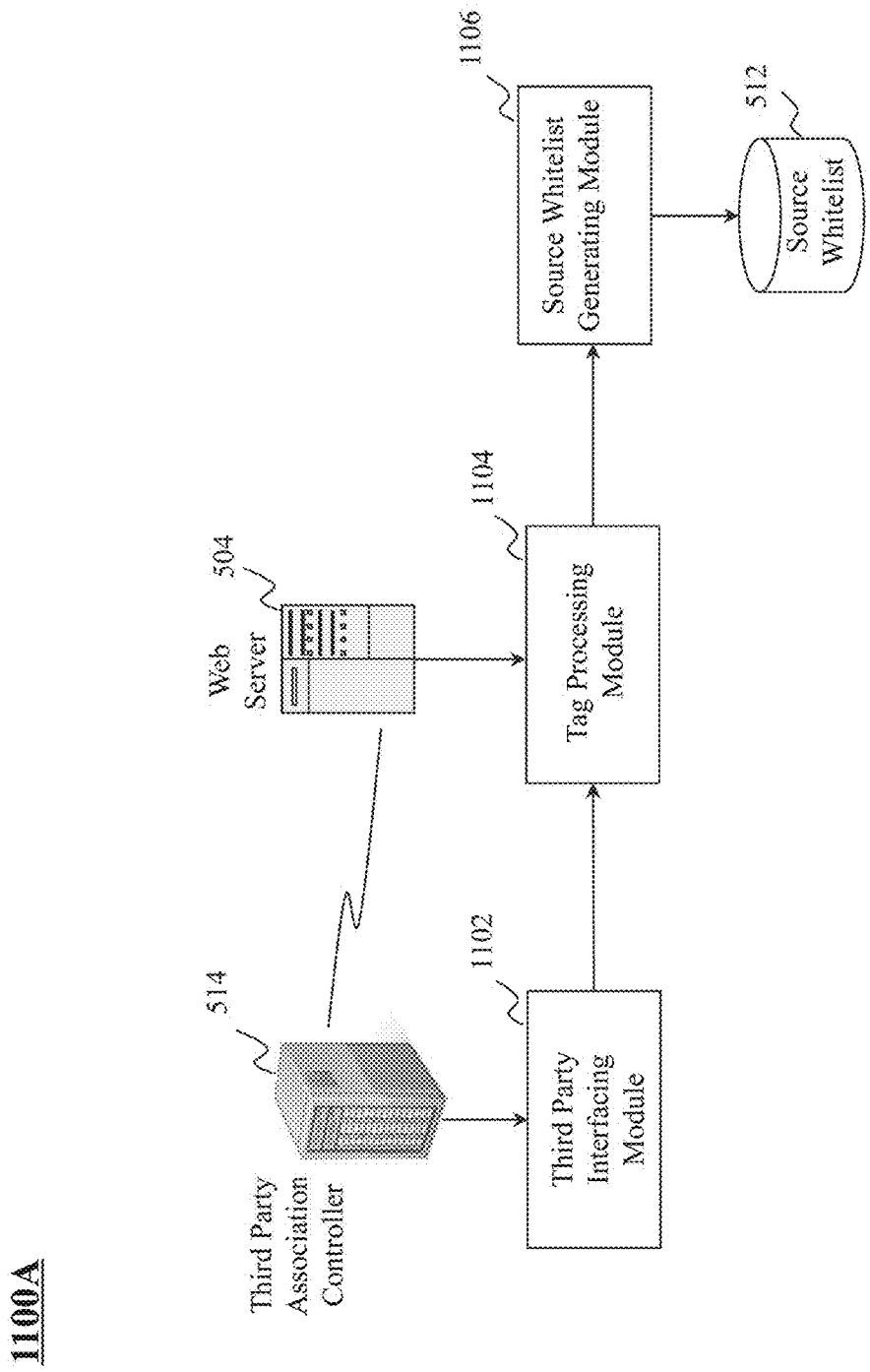
FIG. 11A illustrates an exemplary embodiment of a system diagram of boarding the third party tags on the web page, according to an embodiment of the present teaching.

FIG. 11A illustrates an exemplary embodiment of a system diagram of boarding the third party tags on the web page, according to an embodiment of the present teaching. The system diagram of boarding the third party tags on the web page according to the illustrated embodiment may include a third party interfacing module 1102, a tag processing module 1104, and a source whitelist generating module 1106. The third party interfacing module 1102 may receive a request to board one or more tags on the web page, and forward the request to the tag processing module 1104. The tag processing module 1104 may inquiry the web server 504, and determine whether each of the one or more tag sources is a third party domain associated with the web page. If one tag source is the third party domain associated with the web page, the source whitelist generating module 1106 may generate a whitelisted source corresponding to the tag source; and store the whitelisted source in source whitelist DB 512. According to the present embodiment, third party domains may be associated with the web page via mutual agreements, and associated third party domains may be automatically inserted into the source whitelist DB for CSP construction and enforcement.

In some embodiments, the source whitelist may initially include the domains of the associated third parties. Further, the source whitelist may be supplemented to include URLs associated with the whitelisted domains, newly associated third party domains and URLs, approved fourth party domains and URLs, etc.

Figure 11B:
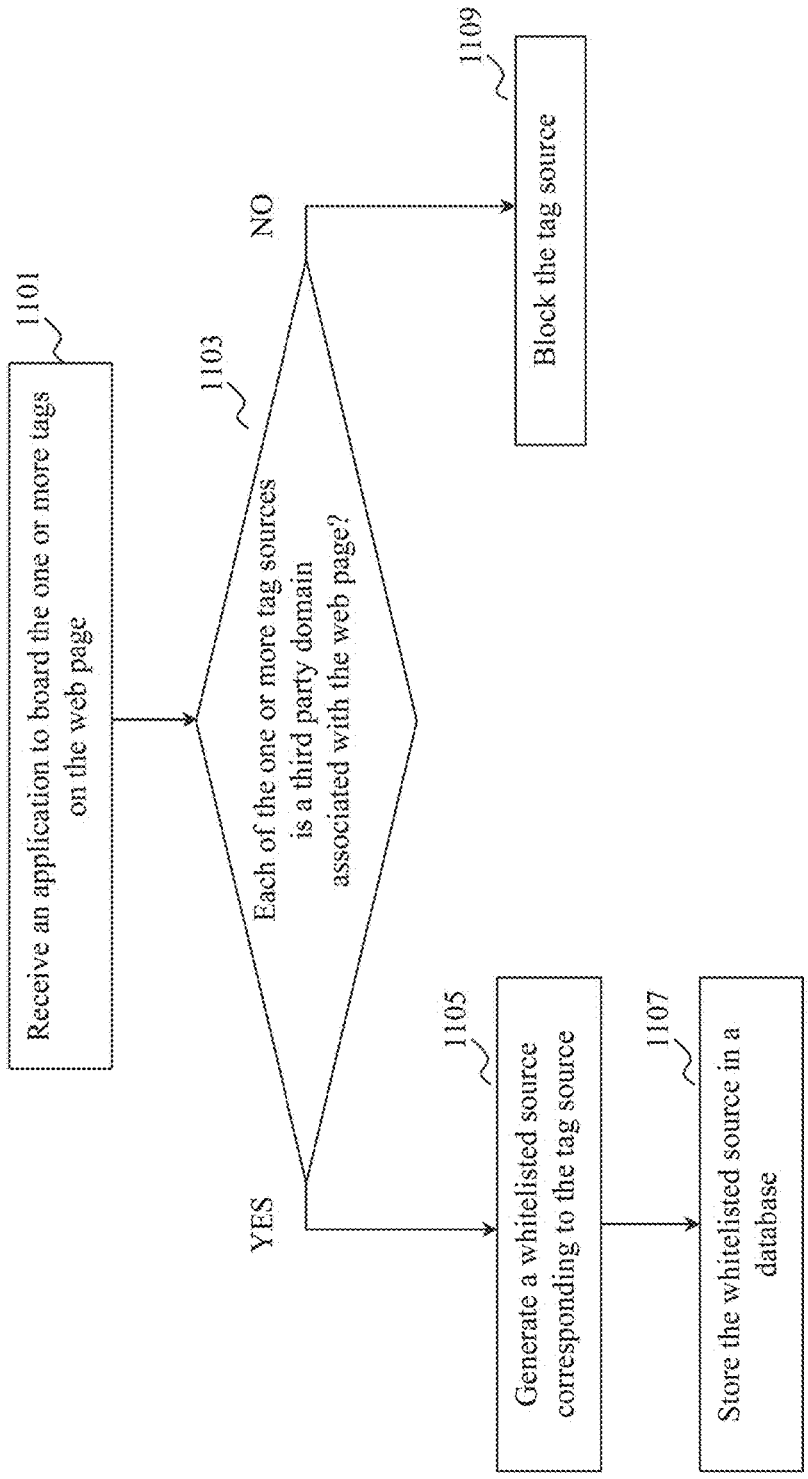
FIG. 11B illustrates an exemplary flowchart of the process for boarding the third party tags on the web page, according to an embodiment of the present teaching.

FIG. 11B illustrates an exemplary flowchart of the process for boarding the third party tags on the web page, according to an embodiment of the present teaching. The process for boarding the third party tags on the web page may include receiving an application to board the one or more tags on the web page 1101; determining whether each of the one or more tag sources is a third party domain associated with the web page 1103; if one tag source is the third party domain associated with the web page, generating a whitelisted source corresponding to the tag source 1105; and storing the whitelisted source in a database 1107; if one tag source is not the third party domain associated with the web page, blocking the tag source 1109.

Figure 12:
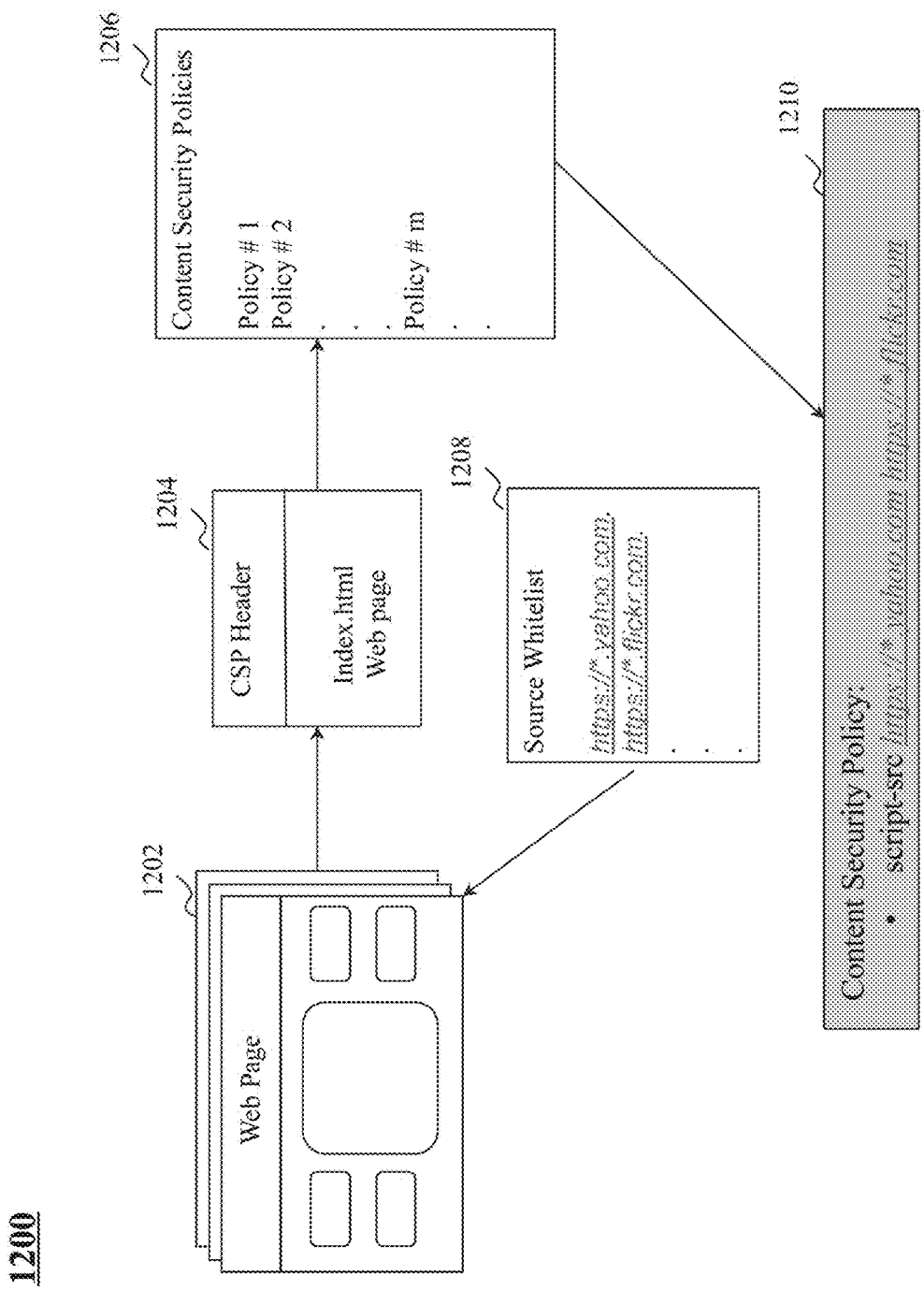
FIG. 12 illustrates an exemplary content security policy applied to a web page, according to an embodiment of the present teaching.

FIG. 12 illustrates an exemplary content security policy applied to a web page, according to an embodiment of the present teaching. When a request to access a web page 1202 is received, the page source of the web page, i.e., index.html, and source whitelist 1208 may be provided to generate CSP implemented page source 1204. In some embodiments, multiple CSPs 1206 may be implemented to the page source. An exemplary CSP 1210 may be encoded as script-src https://*.yahoo.com https://*flickr.com. According to this example, the CSP may be enforced on the page index as well as on the image and frame elements of the web page. Further, the exemplary CSP may allow tags to be loaded from the whitelisted domains yahoo.com and flickr.com. As domains other than the whitelisted ones are prohibited from loading, CSP can prevent the web page from leaking its business sensitive data to third parties not associated with the web page, block any objectionable content being loaded from those unsecure domains, and enforce protection against DOM exposure vulnerabilities such as stolen credentials, fake clicks or user interactions.

Figure 13:
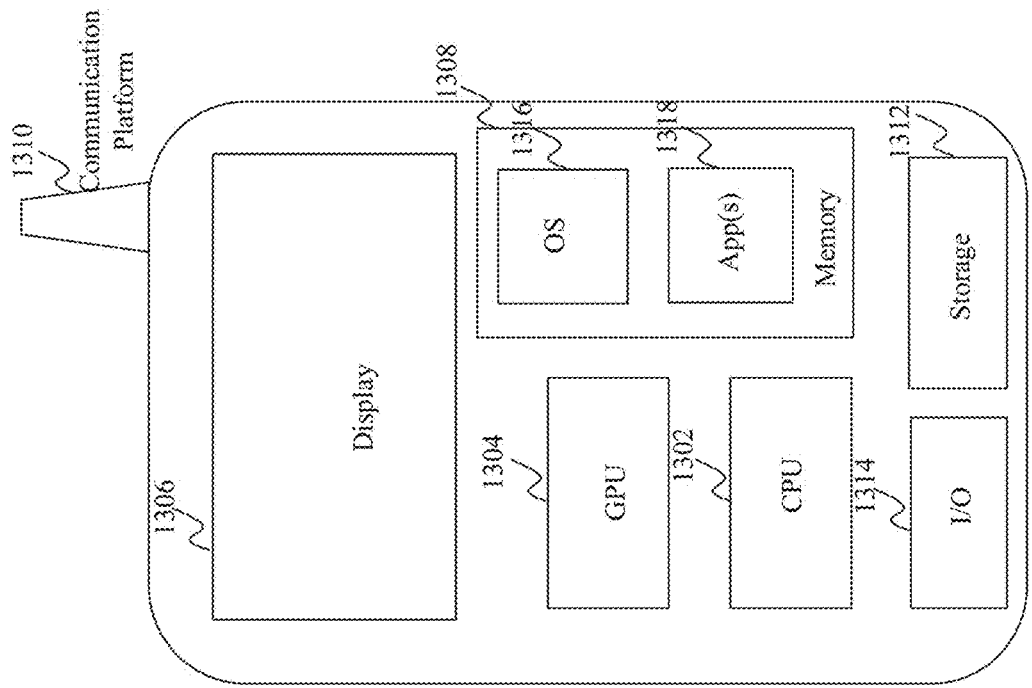
FIG. 13 depicts a general mobile device architecture on which the present teaching can be implemented.

FIG. 13 depicts a general mobile device architecture on which the present teaching can be implemented. In this example, the user device is a mobile device 1300, including but is not limited to, a smart phone, a tablet, a music player, a handled gaming console, a global positioning system (GPS) receiver, a smart-TV, wearable devices, etc. The mobile device 1300 in this example includes one or more central processing units (CPUs) 1302, one or more graphic processing units (GPUs) 1304, a display 1306, a memory 1308, a communication platform 1310, such as a wireless communication module, storage 1312, and one or more input/output (I/O) devices 1314. Any other suitable component, such as but not limited to a system bus or a controller (not shown), may also be included in the mobile device 1300. As shown in FIG. 13, a mobile operating system 1313, e.g., iOS, Android, Windows Phone, etc., and one or more applications 1318 may be loaded into the memory 1308 from the storage 1312 in order to be executed by the CPU 1302. The applications 1318 may include a browser or any other suitable mobile apps for sending the request to access a web page and rendering the web page with approved third party and fourth party tags through the mobile device 1300. Execution of the applications 1318 may cause the mobile device 1300 to perform the processing as described above in the present teaching. For example, presentation of a web page with approved third party and fourth party tags to the user may be made by the GPU 1304 in conjunction with the display 1306. A request for loading a web page may be inputted by the user via the I/O devices 1314 and transmitted via the communication platform 1310.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 14:
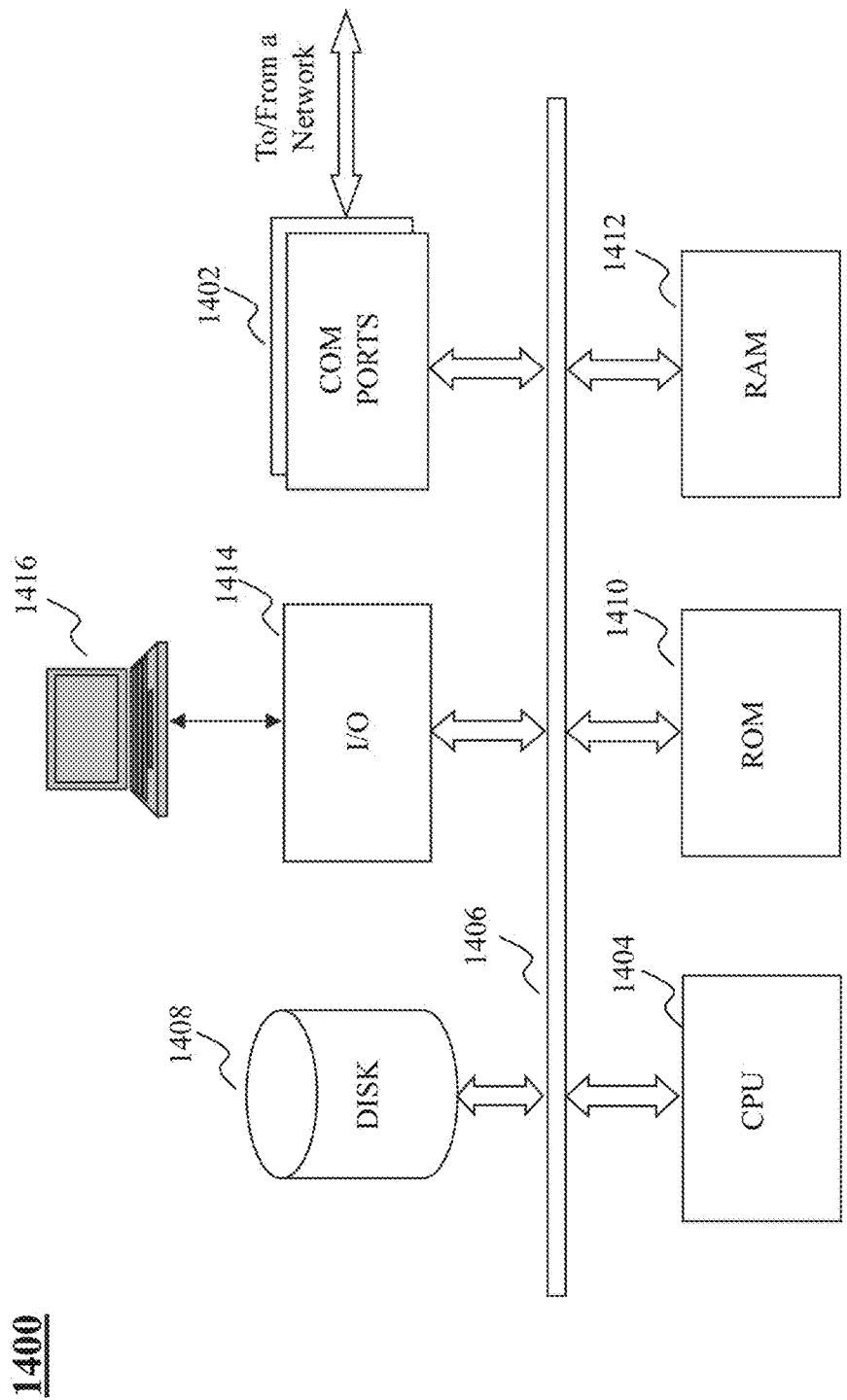
FIG. 14 depicts a general computer architecture on which the present teaching can be implemented.

FIG. 14 depicts a general computer architecture on which the present teaching can be implemented and has a functional block diagram illustration of a computer hardware platform that includes user interface elements. The computer may be a general-purpose computer or a special purpose computer. This computer 1400 can be used to implement any components of the system for blocking malicious third party site tagging using CSP as described herein. Different components of the systems disclosed in the present teaching can all be implemented on one or more computers such as computer 1400, via its hardware, software program, firmware, or a combination thereof. Although only one such computer is shown, for convenience, the computer functions relating to blocking malicious third party site tagging may be implemented in a distributed fashion on a number of similar platforms, to distribute the processing load.

The computer 1400, for example, includes COM ports 1402 connected to and from a network connected thereto to facilitate data communications. The computer 1400 also includes a CPU 1404, in the form of one or more processors, for executing program instructions. The exemplary computer platform includes an internal communication bus 1406, program storage and data storage of different forms, e.g., disk 1408, read only memory (ROM) 1410, or random access memory (RAM) 1412, for various data files to be processed and/or communicated by the computer, as well as possibly program instructions to be executed by the CPU 1404. The computer 1400 also includes an I/O component 1414, supporting input/output flows between the computer and other components therein such as user interface elements 1416. The computer 1400 may also receive programming and data via network communications.

Hence, aspects of the methods of blocking malicious third party site tagging using CSP, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a computing device having at least one processor programmed to execute one or more computer program instructions, storage, and a communication platform connected to a network for blocking malicious third party site tagging, wherein the one or more computer program instructions, when executed, cause the at the at least one processor to perform the method comprising:

receiving, from a user, a request to access a web page;
obtaining a page resource associated with the web page;
adding one or more tags to the page resource, wherein the one or more tags are associated with one or more tag sources, respectively, each of which returns content displayable by the web page;
obtaining at least one content security policy with respect to the page source indicating authorized domains;
blocking, in accordance with the at least one content security policy on the page resource, at least one of the one or more tag sources, wherein the at least one of the one or more tag sources is directed to an additional tag source not within the authorized domains; and
sending, to the user for presentation via a display, the web page in accordance with the at least one content security policy such that the content associated with the at least one of the one or more tag sources is prevented from being loaded to the web page.

2. The method of claim 1, further comprising:
determining whether each of the one or more tag sources is a third party domain associated with the web page;
generating, in response to determining that at least one additional tag source of the one or more tag sources is the third party domain associated with the web page, at least one whitelisted source corresponding to the at least one additional tag source of the one or more tag sources; and
storing the at least one whitelisted source in a database, wherein the authorized domains comprise the at least one whitelisted source.

3. The method of claim 1, further comprising:
determining that at least one of the one or more tags corresponds to one of the one or more tag sources that complies with the at least one content security policy based on the authorized domains comprising a domain associated with the at least one of the one or more tags;
responsive to the determination, obtaining at least one succeeding tag that succeeds the at least one of the one or more tags;
determining whether at least one succeeding tag source corresponding to the at least one succeeding tag complies with the at least one content security policy by determining whether the authorized domains comprise a domain associated with the at least one succeeding tag source; and
loading, in response to determining that the at least one succeeding tag source complies with the at least one content security policy, the at least one succeeding tag for presenting the web page to the user.

4. The method of claim 1, further comprising:
determining that at least one of the one or more tags corresponds to one of the one or more tag sources that complies with the at least one content security policy based on the authorized domains comprising a domain associated with the at least one of the one or more tags;
responsive to the determination, obtaining at least one succeeding tag that succeeds the at least one of the one or more tags;
determining the authorized domains comprise a domain associated with the at least one succeeding tag source, wherein the additional tag source is blocked based on the domain associated with the at least one succeeding tag source not being one of the authorized domains; and
generating a violation record including the at least one succeeding tag source, that least one content security policy that was violated, and a preceding tag source that preceded the at least one succeeding tag source.

5. The method of claim 1, further comprising:
determining, based on a determination that the at least one of the one or more tag sources is directed to the additional tag source not within the authorized domains, that the additional tag source violates the at least one content security policy;
generating a violation record including the additional tag source, the at least one content security policy that was violated, and a preceding tag source that preceded the additional tag source;
applying the at least one content security policy to one or more scenarios;
evaluating the at least one succeeding tag in the one or more scenarios;
determining that the at least one content security policy performs consistently across the one or more scenarios;
generating at least one whitelisted source corresponding to the at least one succeeding tag; and
storing the at least one whitelisted source in a database, wherein the authorized domains comprise a domain associated with the at least one whitelisted source.

6. The method of claim 1, wherein the at least one content security policy defines the authorized domains with which content associated with at least one of the one or more tags and at least one succeeding tag are allowed to be boarded on the web page.

7. A system having at least one processor, storage, and a communication platform for blocking malicious third party site tagging, the system comprising:
the at least one processor programmed to execute one or more computer program instructions which, when executed, cause the at least one processor to:
receive, from a user, a request to access a web page;
obtain a page resource associated with the web page;
add one or more tags to the page resource, wherein the one or more tags are associated with one or more tag sources, respectively, each of which returns content displayable by the web page;
obtain at least one content security policy with respect to the page source indicating authorized domains;
block, in accordance with the at least one content security policy, at least one of the one or more tag sources, wherein the at least one of the one or more tag sources is directed to an additional tag source not within the authorized domains; and
send, to the user for presentation via a display, the web page in accordance with the at least one content security policy such that the content associated with the at least one of the one or more tag sources is prevented from being loaded to the web page.

8. The system of claim 7, wherein the at least one processor is further caused to:
determine whether each of the one or more tag sources is a third party domain associated with the web page; and
generate, in response to determining that at least one additional tag source of the one or more tag sources is the third party domain associated with the web page, at least one whitelisted source corresponding to the at least one additional tag source of the one or more tag sources; and store the at least one whitelisted source in a database, wherein the authorized domains comprise the at least one whitelisted source.

9. The system of claim 7, wherein the at least one processor is further caused to:

determine that at least one of the one or more tags corresponds to one of the one or more tag sources that complies with the at least one content security policy based on the authorized domains comprising a domain associated with the at least one of the one or more tags;

responsive to the determination, obtain at least one succeeding tag that succeeds the at least one of the one or more tags;

determine whether at least one succeeding tag source corresponding to the at least one succeeding tag complies with the at least one content security policy by determining whether the authorized domains comprise a domain associated with the at least one succeeding tag source; and load, in response to determining that the at least one succeeding tag source complies with the at least one content security policy, the at least one succeeding tag for presenting the web page to the user.

10. The system of claim 7, wherein the at least one processor is further caused to:

determine that at least one of the one or more tags corresponds to one of the one or more tag sources that complies with the at least one content security policy based on the authorized domains comprising a domain associated with the at least one of the one or more tags;

responsive to the determination, obtain at least one succeeding tag that succeeds the at least one of the one or more tags, wherein the additional tag source is blocked based on the domain associated with the at least one succeeding tag source not being one of the authorized domains; and generate a violation record including the at least one succeeding tag source, the at least one content security policy that was violated, and a preceding tag source that preceded the at least one succeeding tag source.

11. The system of claim 7, wherein the at least one processor is further caused to:

determine, based on a determination that the at least one of the one or more tag sources is directed to the additional tag source not within the authorized domains, that the additional tag source violates the at least one content security policy;

generate a violation record including the additional tag source, the at least one content security policy that was violated, and a preceding tag source that preceded the additional tag source;

apply the at least one content security policy to one or more scenarios;

evaluate the at least one succeeding tag in the one or more scenarios;

determine that the at least one content security policy performs consistently across the one or more scenarios; and generate at least one whitelisted source corresponding to the at least one succeeding tag; and store the at least one whitelisted source in a database, wherein the authorized domains comprise a domain associated with the at least one whitelisted source.

12. The system of claim 7, wherein the at least one content security policy defines the authorized domains with which content associated with at least one of the one or more tags and at least one succeeding tag are allowed to be incorporated into the web page.

13. A non-transitory machine-readable medium having one or more computer program instructions recorded thereon for blocking malicious third party site tagging, wherein the one or more computer program instructions, when executed by one or more processors of a computing device, causes the one or more processors to perform the following:

receiving from a user, a request to access a web page;

obtaining a page resource associated with the web page;

adding one or more tags to the page resource, wherein the one or more tags are associated with one or more tag sources, respectively, each of which returns content displayable by the web page;

obtaining at least one content security policy with respect to the page source indicating authorized domains;

blocking, in accordance with the at least one content security policy, at least one of the one or more tag sources, wherein the at least one of the one or more tag sources is directed to an additional tag source not within the authorized domains; and send, to the user for presentation via a display, the web page in accordance with the at least one content security policy such that the content associated with the at least one of the one or more tag sources is prevented from being loaded to the web page.

14. The medium of claim 13, wherein the one or more computer program instructions, when executed by the one or more processors, causes the one or more processors to further perform the following:

determining whether each of the one or more tag sources is a third party domain associated with the web page;

generating, in response to determining that at least one additional tag source of the one or more tag sources is the third party domain associated with the web page, at least one whitelisted source corresponding to the at least one additional tag source of the one or more tag sources; and storing the at least one whitelisted source in a database, wherein the authorized domains comprise the at least one whitelisted source.

15. The medium of claim 13, wherein the one or more computer program instructions, when executed by the one or more processors, causes the one or more processors to further perform the following:

determining that at least one of the one or more tags corresponds to one of the one or more tag sources that complies with the at least one content security policy based on the authorized domains comprising a domain associated with the at least one of the one or more tags;

responsive to the determination, obtaining at least one succeeding tag that succeeds the at least one of the one or more tags;

determining whether at least one succeeding tag source corresponding to the at least one succeeding tag complies with the at least one content security policy by determining whether the authorized domains comprise a domain associated with the at least one succeeding tag source; and loading in response to determining that the at least one succeeding tag source complies with the at least one content security policy, the at least one succeeding tag for presenting the web page to the user.

16. The medium of claim 13, wherein the one or more computer program instructions, when executed by the one or more processors, causes the one or more processors to further perform the following:
 determining that at least one of the one or more tags corresponds to one of the one or more tag sources that complies with the at least one content security policy based on the authorized domains comprising a domain associated with the at least one of the one or more tags;
 responsive to the determination, obtaining at least one succeeding tag that succeeds the at least one of the one or more tags;
 determining the authorized domains comprise a domain associated with the at least one succeeding tag source, wherein the additional tag source is blocked based on the domain associated with the at least one succeeding tag source not being one of the authorized domains; and
 generating a violation record including the at least one succeeding tag source, the at least one content security policy that was violated, and a preceding tag source that preceded the at least one succeeding tag source.

17. The medium of claim 13, wherein the one or more computer program instructions, when executed by the one or more processors, causes the one or more processors to further perform the following:
 determining, based on a determination that the at least one of the one or more tag sources is directed to the additional tag source not within the authorized domains, that the additional tag source violates the at least one content security policy;
 generating a violation record including the additional tag source, the at least one content security policy that was violated, and a preceding tag source that preceded the additional tag source;
 applying the at least one content security policy to one or more scenarios;
 evaluating the at least one succeeding tag in the one or more scenarios;
 determining that the at least one content security policy performs consistently across the one or more scenarios;
 generating at least one whitelisted source corresponding to the at least one succeeding tag; and
 storing the at least one whitelisted source in a database, wherein the authorized domains comprise a domain associated with the at least one whitelisted source.

18. The method of claim 1, wherein each of the one or more tag sources corresponds to at least one of a domain associated with a third party advertisement, a third party content provider, an entity that is authorized to tag a publisher of the web page, and an entity that is allowed to access and analyze data associated with the web page.

19. The method of claim 1, wherein blocking the at least one of the one or more tag sources directed to the additional tag comprises:
 returning null content to the web page.

20. The method of claim 1, wherein obtaining the at least one content security policy comprises:
 constructing the at least one content security policy associated with the web page to define the authorized domains as secure.

21. The method of claim 1, wherein the at least one content security policy comprises a plurality of content security policies enforced in a hierarchical structure, wherein a first set of content security policies are enforced at a page level, a second set of content security policies are enforced at an element level of the web page based on tag instrumenting schemes of a corresponding tag source, or the first set of content security policies are enforced at the page level and the second set of content security policies are enforced at the element level of the web page.

* * * * *